United States Patent
Goma Ayats

(10) Patent No.: US 7,534,185 B2
(45) Date of Patent: May 19, 2009

(54) CONTINUALLY VARIABLE TRANSMISSION

(76) Inventor: Juan Ramon Goma Ayats, C/ Mare de Déu de Port, 293 1°1°, 08038 Barcelona (ES)

(*) Notice: Subject to any disclaimer, the term of this patent is extended or adjusted under 35 U.S.C. 154(b) by 420 days.

(21) Appl. No.: 10/587,552

(22) PCT Filed: Feb. 15, 2005

(86) PCT No.: PCT/ES2005/000075

§ 371 (c)(1),
(2), (4) Date: Jul. 27, 2006

(87) PCT Pub. No.: WO2005/078315

PCT Pub. Date: Aug. 25, 2005

(65) Prior Publication Data

US 2007/0173366 A1   Jul. 26, 2007

(30) Foreign Application Priority Data

Feb. 16, 2004   (ES)   ................. 200400433

(51) Int. Cl.
*F16H 37/02* (2006.01)
(52) U.S. Cl. ................. 475/209; 475/218
(58) Field of Classification Search ............ 475/5, 475/207, 208, 209, 218
See application file for complete search history.

(56) References Cited

U.S. PATENT DOCUMENTS

| | | | |
|---|---|---|---|
| 1,762,199 A | 6/1930 | Standish | |
| 1,833,475 A | 11/1931 | Standish | |
| 2,384,776 A | 9/1945 | Trofimov | |
| 2,745,297 A | 5/1956 | Andrus | |
| 4,823,640 A | 4/1989 | Donnelly | |
| 4,936,165 A | 6/1990 | Doyle et al. | |
| 5,167,591 A | 12/1992 | Cowan | |
| 5,558,589 A * | 9/1996 | Schmidt | 475/5 |
| 5,564,998 A | 10/1996 | Fellows | |
| 5,643,121 A | 7/1997 | Greenwood et al. | |
| 5,730,676 A * | 3/1998 | Schmidt | 475/5 |
| 6,595,884 B1 | 7/2003 | Ai et al. | |
| 6,723,016 B2 * | 4/2004 | Sumi | 475/216 |
| 7,094,171 B2 * | 8/2006 | Inoue | 475/215 |

FOREIGN PATENT DOCUMENTS

| | | |
|---|---|---|
| EP | 1 097 830 | 11/2000 |
| ES | 2 142 233 | 4/1997 |
| ES | 2 190 739 | 9/2001 |
| FR | 91705 | 12/1965 |
| FR | 75 06731 | 3/1975 |
| FR | 80 10953 | 5/1980 |
| GB | 2068064 | * 8/1981 |
| SU | 1206108 | * 1/1986 |
| WO | WO 02/50452 | 6/2002 |
| WO | WO 02/081246 | 10/2002 |

* cited by examiner

*Primary Examiner*—Ha D. Ho
(74) *Attorney, Agent, or Firm*—Notaro & Michalos P.C.

(57) ABSTRACT

A gear ratio mechanism contains five shafts, high and low range modules, and an inverter between a countershaft and an output shaft. A core and four multiplicities of gear ratios extend the range of variability. The core contains two differentials and a core input shaft drives a shaft of each differential. A core output shaft is driven by another differential and a third shaft of each differential is connected to a variator. The low range module contains two differentials and the input shaft drives a shaft of one. The countershaft is driven by another shaft from the other differential. Two multiplicities of gear ratios are between the shafts not connected to the input or output shafts and the variator is between a shaft of the first and one of the second gear ratio.

19 Claims, 9 Drawing Sheets

CONTINUALLY VARIABLE TRANSMISSION

OBJECT OF THE INVENTION

The object of the present invention is a mechanical transmission with continuously variable gear ratio that is obtained using the suitable combination of a series of mechanisms disclosed in the patent, which combines the action of a speed variator with various fixed gear ratios and differential mechanisms so that the power that circulates through the speed variator can be reduced to the extent desired. The patent discloses how to achieve this with the minimum number of components and so that the power transmitted passes as directly as possible from the input shaft to the output shaft, also achieving that torque is transmitted to the output shaft without interruption at any time.

BACKGROUND OF THE INVENTION

When mechanical rotation power is transformed at a determined angular velocity $\omega 1$ to another at a different angular velocity $\omega 2$, the quotient between both is called gear ratio. The speed variation mechanisms, or continuously variable transmission, aim that this gear ratio varies continuously and progressively.

Continuously variable transmissions can be classified in three large groups: A) Mechanisms that transmit the rotation directly from the input shaft to the output shaft via an intermediate element which, by friction, is driven by the input shaft and, in turn, drives the output shaft; this group includes v-belt speed variators, toroidal variators, conical roller variators, etc. B) Systems which transform the mechanical rotation power from the input shaft into another form of energy that is easier to handle and then again transform it into mechanical rotation power in the output shaft; this group includes hydrostatic variators, torque converters, pairs of electric machines, one working as a generator and the other as an engine, systems that transform the rotary movement into another oscillatory movement and then again generate a rotary movement with this. C) Systems which combine mechanisms from the previous groups with one or more differential mechanisms.

Group A mechanisms allow the continuous progressive variation of the gear ratio from a minimum value to a maximum value, both of the same sign, i.e. they do not allow the rotation direction to be reversed, due to the fact that to pass through zero gear ratio the friction element should drive one of the shafts on a null radius with infinite tension; indeed there is a minimum close to which the friction element slides and the mechanism stops working. The energy output is poor compared with those of gear transmissions due to a friction element.

Those of group B, if correctly designed, can reverse the rotation direction but also have a poor mechanical output compared to those of gear transmissions, due to the fact that losses accumulate in each transformation of power to another form.

Group C) mechanisms, i.e. the combination of one or more differential mechanisms with a speed variator, have been applied with two possible purposes: to obtain a mechanism that allows the variator's rotation direction to be reversed starting from a variator that initially did not allow this. To divide the power in two parts, one is transmitted via the variator and the other is transmitted via gears, which achieves a smaller variator and a greater mechanical output of the mechanism as a whole.

These mechanisms can, in turn, be classified in two subgroups: those that simply combine a variator with one or more differentials and those which add an external gear change to increase the variation range of the basic mechanism.

Within the mechanisms limited to combining a variator with a differential, there are several patents that disclose how to reduce the power transmitted by the variator, for example U.S. Pat. No. 1,762,199; these mechanisms are known as "power split". Others such as, for example, U.S. Pat. No. 1,833,475, FR091705, U.S. Pat. No. 2,745,297, ES2142223 disclose mechanisms that allow the rotation direction to be reversed, these mechanisms are known as "power recirculating".

Differences between some patents and others stem from the type of variator, from the type of differential and from the transmissions adopted to connect them.

It is not possible to obtain both effects simultaneously. Mechanisms that reverse the rotation direction ("power recirculating") amplify the power which circulates through the variator; mechanisms that reduce the power that circulates through the variator ("power split") do not allow the rotation direction to be reversed.

Mechanisms such as those disclosed in the previous patents, achieve the mechanism's overall gear ratio in function of the variator gear ratio according to an equation of type:

$$\tau = a + b \cdot r \quad r_{min} \leq r \leq r_{max}$$

or $$\tau = \frac{1}{a + b \cdot r} r_{min} \leq r \leq r_{max}$$

Where:

$\tau$ is the mechanism's overall gear ratio, i.e. the angular velocity of the output shaft divided by the angular velocity of the input shaft.

r is the speed variator's gear ratio: this ratio varies between a minimum value $r_{min}$ and a maximum value $r_{max}$, both of the same sign in the event that the variator does not have the characteristic of being able to reverse the rotation direction.

a and b are constants which depend on the fixed gear ratios, on the differential's characteristics and the way in which different components are interconnected.

In these conditions, the power transmitted by the variator is a function of the mechanism's gear ratio at all times, if constants a and b are chosen so that the point at which this power is at its maximum, this value is the minimum value possible so that:

For mechanisms with a group A variator:

$$\lambda_{max} = \frac{\beta - 1}{\beta} \cdot \frac{rang}{rang - 1}$$

And for mechanisms with a group B variator:

$$\gamma_{max} = \frac{\beta - 1}{\beta + 1}$$

Where:

$\gamma_{max}$ is the power fraction transmitted by the mechanism that passes through the variator, i.e. the power transmitted by the variator divided by the total power transmitted by the mechanism when the gear ratio makes this value the maximum.

β is the variability in the mechanism gear ratio, i.e. the maximum gear ratio that can be obtained divided by the minimum.

rang is the range of variability of the variator, i.e. $r_{max}/r_{min}$.

Mechanisms have also been proposed that combine two or more differentials with a variator and a greater or lesser quantity of countershaft ratios between these elements; examples of this type of mechanism are disclosed in patents U.S. Pat. No. 2,384,776, U.S. Pat. No. 4,936,165, ES2190739, FIGS. 17, 18 and 19 illustrate the mechanisms respectively proposed in each of said patents in block diagrams. They all manage to obtain the mechanism's overall gear ratio in accordance with the variator gear ratio of type:

$$\frac{\omega_o}{\omega_i} = \tau = \frac{a \cdot r + b}{c \cdot r + d}$$

Where τ is the mechanism's global gear ratio, r is the variator gear ratio and a, b, c and d adopt values according to the characteristics of the differentials and countershaft ratios.

Despite permitting an advantage with respect to those that use a single differential, these mechanisms have the drawback of the losses arising in the countershafts.

There is a known solution that eliminates countershafts and which has been disclosed in patent U.S. Pat. No. 6,595,884 (the block diagram of the mechanism claimed therein is shown in FIG. 20). Despite eliminating countershafts, this mechanism still has the drawback that only part of the power passes directly from the input shaft to the output shaft crossing a single differential, the rest has to cross two differentials which mean an accumulation of losses.

Mechanisms that add an external gear change aim to achieve wider overall variability of the mechanism and, likewise, they have to reduce the variability of the basic mechanism to the minimum, which means, if the components are suitably chosen, the power fraction that circulates through the variator can be reduced as much as desired, to add a sufficiently large number of gears in the external change.

Two forms of increasing the range by a 30 external gear change have been disclosed, the first as disclosed in patent U.S. Pat. No. 5,167,591, whose operation can be summarised as follows: supposing that we start with the minimum gear ratio, it is first changed progressively until reaching the maximum, at this point the transmission is disconnected by clutch, during this disconnection it is changed to the minimum gear ratio and the following gear is connected repeating the cycle.

The drawback of this system is that during the gear change the system remains disconnected for a time (out of gear); this time is not negligible as the variator should pass from its maximum gear ratio to the minimum or vice versa before being able to be reconnected (put in gear); on the other hand this solution allows the system to be designed with as many steps as desired and allows any progression between steps.

Another solution is disclosed in patent U.S. Pat. No. 5,643, 121; the idea consists of alternatively connecting one of two shafts of the differential to the output shaft (the third shaft is the mechanism input), the alternation obtaining a gear ratio change. The gear ratios are determined so that during the transition both ratios can be kept in gear simultaneously using different clutches (synchronous change) meaning that the transition time can be negligible and, furthermore, the power transfer to the output shaft is not lost during the transition. The system would equally function if the input shaft was the output shaft and vice versa. Although more than two steps can be connected (as the author comments in the patent) they are all interdependent and the system can only be optimized for the first two.

Thus in a system with two steps such as the example shown in the patents, a variability of $6.25=2.5^2$ is obtained with the same maximum fraction of power through the variator than if the variability was 2.5 (71.4%). But increasing the number of steps until the infinite would only achieve a 50% reduction in the fraction of power through the variator.

Patent U.S. Pat. No. 5,643,121 also discloses the form of reversing the rotation direction, for which it adds a second differential; this second differential idles in all regimes except those which allow the change in rotation direction, wherein the second differential subtracts the speeds of the two arms of the first differential to allow variation from a positive value to a negative value passing through zero. During the regime that allows the rotation direction to be reversed, the system responds to a scheme such as that of FIG. 21. The input power passes to the output crossing the two differentials and with recirculation through the variator.

All these systems require for their embodiment a control system that, starting from the gear ratio one wants to obtain at any time, acts on the variator element. This action is performed using mechanisms actuated by electric motors or pneumatic or hydraulic cylinders, etc.

DESCRIPTION OF THE INVENTION

The technical problem posed in the speed variation mechanisms comprised of a variator and differentials, consists of reducing to a minimum the power that circulates through the speed variation element, simultaneously obtaining a wide range of speed variations in the overall mechanism, eventually reversing the rotation direction.

Likewise, the aim is that the mechanism's number of gears, regimes or steps is kept to a minimum.

It is also of interest that the change from one step to another can be performed without disconnecting the mechanism i.e. without stopping torque transmission to the output shaft.

Likewise, it is of interest that the power passes from the input shaft to the output shaft as directly as possible, if possible without crossing countershaft ratios and if possible passing through a single differential.

The present invention resolves the problem posed by the combination of the novelties with respect to the current state of the art described below.

The mechanism whose diagram is represented in FIG. 1 consists of two differentials (Da and Db) and a speed variator (V). Both the input shaft (shaft i) and the output shaft (shaft o) are simultaneously connected to one of the shafts of each one of differentials Da and Db whilst the variator is connected between the shaft of differential Da, not connected to the input or the output shaft (shaft 6) and the shaft of differential Db, not connected to the input or the output shaft (shaft 7).

This mechanism obtains the mechanism's overall gear ratio in accordance with the variator gear ratio of the type:

$$\frac{\omega_o}{\omega_i} = \tau = \frac{a \cdot r + b}{c \cdot r + d}$$

Where τ is the mechanism's overall gear ratio, r is the variator gear ratio and a, b, c and d adopt the following values:

| a | -Db |
| --- | --- |
| b | Da |
| c | -Db · (1 - Da) |
| c | Da · (1 - Db) |

Where Da is the gear ratio between shaft 6 and the input shaft which would cause differential Da if the output shaft was kept blocked, and Db is the gear ratio which would cause differential Db between the input shaft and shaft 7 if the output shaft was kept blocked.

In this mechanism suitably selecting Da and Db achieve that the maximum power passing through the variator does not exceed:

$$\lambda_{max} = \frac{\sqrt{rang+1}}{\sqrt{rang-1}} \cdot \frac{\sqrt{\beta-1}}{\sqrt{\beta+1}}$$

$$\gamma_{max} = 2 \cdot \frac{\alpha \cdot \sqrt{\beta} - 1}{\alpha^2 \cdot \beta - 1} - 1$$

$$\alpha = \frac{(1+\sqrt{\beta})^2 + \sqrt{(1+\sqrt{\beta})^4 - 16 \cdot \beta}}{4 \cdot \beta}$$

In the event of using group A variators and a maximum power of:

In the event of using variators that allow the rotation direction to be reversed.

Furthermore, there are no countershafts and the output is not harmed by having two differentials instead of one, since the input power is divided, one part passing through one of the differentials and the rest through the other, meaning that the energy losses are not greater than would arise if a single differential was used.

The two differentials act symmetrically; there are regimes wherein the majority of the power passes through Da and the rest through Db and others the reverse, there is also a regime wherein it is exactly divided by 50%.

The following element incorporated by the present invention is the multistep mechanism whose diagram is represented in FIG. 2. This mechanism increases the variability range of the system core.

This mechanism consists of a core represented by a black box with letter V which is a reversible speed variation mechanism with input shaft i and output shaft o; this core can be embodied with the disclosed system before or using any other known system. The mechanism has four multiplicities of gear ratios, gear ratio units $R_{2n}$, $R_{2n+1}$, $S_{2n}$ and $S_{2n+1}$, the input shaft of the mechanism i' is connected alternatively to input shaft i of the core and to output shaft o thereof, whilst the output shaft of mechanism o' is alternatively connected to output shaft o of the core and to input shaft i. This mechanism functions as follows: Initially input shaft i' is connected via the first ratio $R_0$ to shaft i and output shaft o' is connected via $S_0$ to o, variator V varies its gear ratio from $\tau_{min}$ to $\tau_{max}$, at this point $R_1$ and $S_1$ are connected and $R_0$ and $S_0$ are disconnected, the mechanism V again varies its gear ratio from $\tau_{max}$ to $\tau_{min}$ at the point when $R_2$ and $S_2$ are connected and so on and so forth.

Choosing the gear ratios so that:

$$R_{2n}=R_0 \cdot \beta_n \quad S_{2n}=S_0 \cdot \beta_n$$

$$R_{2n+1}=R_0 \cdot \beta_n \tau_{max} \quad S_{2n+1}=S_0 \cdot \beta_n \tau_{min}$$

Where:

$$\beta = \frac{\tau_{max}}{\tau_{min}}$$

The transitions can be made maintaining the four gear ratios simultaneously connected.

In this mechanism the following overall variability is obtained:

$$\beta' = \beta^m$$

Where m is the number of steps. This mechanism guarantees torque transmission during the transition and allows the core variability to be reduced as much as desired for the overall mechanism.

In this mechanism it is preferably convenient that the core is formed from a mechanism which follows the scheme of FIG. 1 as it allows the least number of possible steps and the maximum output for a given variator, but it is also possible that the core is embodied by any other known system and benefits from the advantages of this increase in variability range.

In mechanical transmissions with continuously variable gear ratios, we should distinguish two working zones: the low range zone and the high range zone. Since these systems allow gear ratios up to zero to be obtained, the output torque can be increased until very high values (it would tend to the infinite if the mechanical output was 100%); there therefore exists a gear ratio zone close to zero where it is necessary to limit the torque that the mechanism exerts on the output shaft. This zone is the low range zone, the other gear ratios are the high range zone. The low range zone is more accurately defined as:

$$-\tau_{eq} \leq \tau \leq \tau_{eq}$$

$$\tau_{eq} = \frac{T_{maxeng}}{T_{maxmec}}$$

Where $\tau_{eq}$ is the gear ratio that limits the low range zone and the high range zone. $T_{max\ eng}$ is the maximum torque that the engine can supply which will be connected to the mechanism input. $T_{max\ mec}$ is the maximum torque allowed at the mechanism output.

In the low range zone, the power that passes through the mechanism is lower than the nominal power of the engine, linearly reducing from 100% in the gear ratio that limits the low range and the high range to zero in the zero gear ratio.

Analysing the mathematical expressions that determine the power that passes through the variator in the low range zone and in the high range zone, demonstrates that for the multistep system working in the high range zone, the optimum distribution of the steps is a series of gear ratios that follow a geometric progression, whilst in the low range zone the optimum distribution is a succession which follows an arithmetic progression.

All known multistep systems that transmit torque continuously to the output shaft, as with that previously described, generate a succession of steps that follow a geometric progression.

Below, we describe two mechanisms object of the present invention that generate a succession of steps that can follow an arithmetic progression, for which reason they are of preferred application for the low range zone.

The mechanism whose diagram is represented in FIG. 3 consists of two differentials Dc and Dd and a speed variator V that must allow the reversal (or at least stopping) of the rotation direction of either of the two shafts whilst the other rotates. Input shaft i is connected to one of the shafts of differential Dc and output shaft o to one of the shafts of differential Dd. The speed variator is connected between shaft 6 and shaft 7 whilst, between shafts 8 and 7, it is possible to connect and disconnect (by suitable mechanical connection or clutches) any of the multiplicities of gear ratios $R_{1ii}$. Likewise between shafts 6 and 9, it is possible to connect and disconnect any of the multiplicities of gear ratios $R_{2j}$. Alternatively, they can also be connected following schemes such as those of FIGS. 7 and 8 where the only difference is that the variator is connected between shafts 8 and 6 in the case of FIG. 7 and between 7 and 9 in the case of FIG. 8. The system functions as follows. Initially gear ratios $R_{11}$ and $R_{21}$ and the variator are connected and it varies its gear ratio from ∞ (shaft 6 stopped and shaft 7 rotating at the rate imposed by differential Dc and the gear ratio R to O (shaft 7 stopped and shaft 6 rotating at the rate imposed by Dc), at this point both shaft 6 and 9 are stopped, gear ratio R22 is connected and R21 disconnected, the variator then again varies its gear ratio from 0 to ∞, at this point both shafts 8 and 7 are stopped, R12 is connected and R21 disconnected, and so on and so forth.

In these mechanisms (for the case of FIG. 3) the gear ratio obtained $$\tau = \frac{(1-Dc) \cdot R_{1i} \cdot r - (1-Dc) \cdot Dd \cdot R_{2i} \cdot R_{1i}}{(1-Dd) \cdot r - Dc \cdot (1-Dd) \cdot R_{1i}}$$

is:

For the mechanism of FIG. 7 (the mechanism of FIG. 8 is $$\tau = \frac{(1-Dc) \cdot R_{1i} \cdot r - (1-Dc) \cdot Dd \cdot R_{2i}}{(1-Dd) \cdot r - Dc \cdot (1-Dd)}$$

symmetrical to that of FIG. 7 reversing the input shaft for the output shaft) the gear ratio is:

Where Dc is the gear ratio that differential Dc would impose between shaft 6 and 8 if shaft i was blocked and Dd is the gear ratio that differential Dd would impose between shaft i and 7 if shaft o was blocked.

In both cases when r is equal to zero:

$$\tau = \frac{1-Dc}{1-Dd} \cdot R_{2i}$$

And when r is equal to ∞:

$$\tau = \frac{1-Dc}{1-Dd} \cdot R_{1i}$$

Therefore, if we want to design a system whose 5 gear ratios vary between:

| Step | Minimum gear ratio | Maximum gear ratio |
|---|---|---|
| 1 | $\tau_{1min}$ | $\tau_{1max}$ |
| 2 | $\tau_{1max}$ | $\tau_{2max}$ |
| ... | ... | ... |
| y | $\tau_{y-1max}$ | $\tau_{imax}$ |

With:

$$R_2 = \frac{(1-Dd) \cdot Dc}{(1-Dc) \cdot Dd}$$

$$R_1 = \frac{1-Dd}{1-Dc}$$

It suffices to choose:

$$R_{21}=R_2\tau_{1min}, R_{11}=R_1\tau_{1max}, R_{22}=R_2\tau_{2max}$$

$$R_{12}=R_1\tau_{3max}, R_{23}=R_2\tau_{4max}, R_{13}=R_1\tau_{5max}$$

And so on and so forth.

In the particular case that Dc=Dd then R1=R2=1 and the previous expressions are:

$$R_{21}=\tau_{1min}, R_{11}=\tau_{1max}, R_{22}=\tau_{2max}, R_{12}=\tau_{3max},$$
$$R_{23}=\tau_{4max}, R_{13}=\tau_{5max},$$

Therefore, this mechanism achieves a multistep system capable of generating a succession of steps that follow an arithmetic, geometric or any other progression. The fact of being able to obtain arithmetic progression makes it especially suitable for the low range regime, for which reason it is considered as a preferred application, although it can also be applied to the high range regime or both simultaneously.

The mechanism previously described resolves the problem of obtaining an arithmetic progression with a minimum number of components, but has the drawback that the power integrally crosses differential Dc first and then differential Dd. For applications wherein greater output is sought at greater cost, below we describe a mechanism that would also allow arithmetic progression to be obtained.

The mechanism whose diagram is represented in FIG. 4 is comprised of a series of differentials, a variator of the type that allows the reversal (or at least the stopping) of the rotation direction of either of the two shafts, whilst the other rotates and a series of gear ratios $R_i$; one of the shafts of each differential is connected to the input shaft and another of the shafts of each differential is connected to the output shaft; the shaft of the odd differentials not connected to the input or the output can be connected by a clutch or by any other type of mechanical connection to one of the shafts of the variator (shaft 6) via one of the gear ratios $R_{2n+1}$; the shaft of the even differentials not connected to the input or the output can be connected by a clutch or by any other type of mechanical connection to the other of the shaft of the variator (shaft 7) via one of the gear ratios $R_{2n}$.

The mechanism functions as follows: Initially differentials $D_1$ and $D_2$ are connected to shafts 6 and 7 respectively via gear ratios $R_1$ and $R_2$, the variator varies its gear ratio from 0 (where shaft 7 remains stopped and shaft 6 rotates at the rate imposed by $D_1$ and $D_2$) to ∞ (where shaft 6 remains stopped and the rate imposed by $D_1$ and $D_2$), at this point $D_3$ is connected and $D_1$ is disconnected, then shaft 7 rotates the variator which varies its gear ratio from ∞ until again reaching 0 where $D_4$ is connected and $D_2$ disconnected.

So that three differentials can be kept simultaneously connected for a short time interval during the transition, it is necessary to choose gear ratios $R_i$ (for i greater than 2) so that the following is complied with:

$$R_{i+1} = \frac{D_i - D_{i+1}}{1 - D_{i+1}} \cdot \frac{1 - D_{i-1}}{D_1 - D_{i-1}} \cdot R_{i-1}$$

The values of $R_1$ and $R_2$ can be freely chosen to facilitate the remainder or to obtain the most suitable angular velocities of the different mechanism shafts. When the result of the previous expression is negative it means that the gear ratio must reverse the rotation direction.

In this mechanism, the gear ratio obtained is:

$$\tau = \frac{D_1 \cdot (1 - D_j) \cdot R_j \cdot r - D_j \cdot (1 - D_i) \cdot R_i}{\cdot (1 - D_j) \cdot R_j \cdot r - (1 - D_i) \cdot R_i}$$

Where $R_i$ is the gear ratio between shaft 6 and the shaft of the odd differential that is not connected to the input or to the output, $R_j$ is the gear ratio between shaft 7 and the shaft of the even differential that is not connected to the input or the output, $D_i$ is the gear ratio that the odd differential would impose between the input shaft and the output shaft if the shaft connected to the variator was kept stopped and $D_j$ is the gear ratio that the even differential would impose between the input shaft and the output shaft if the shaft connected to the variator was kept stopped.

If we want a succession of gear ratios:

$$[\tau_{1min}, \tau_{1max}], [\tau_{1max}, \tau_{2max}], [\tau_{2max}, \tau_{3max}]$$

It suffices to choose:

$$D_1 = \tau_{1min}, D_2 = \tau_{1max}, D_3 = \tau_{2max}, D_4 = \tau_{3max}$$

If any value is 0, instead of a differential it provides the possibility of directly connecting shaft 6 or 7 (depending on whether it is an odd or even differential) to the output via the corresponding gear ratio; FIG. 9 shows this particular case for differential $D_1$, in the first step shaft 6 is directly connected to the output via gear ratio $R_1$ and shaft 7 to differential $D_2$ via gear ratio $R_2$.

This mechanism, as with the previous one, allows steps to be obtained that follow arithmetic, geometric or any other progressions, therefore, it is recommended for both low range and high range regimes.

In all the multistep mechanisms, each step requires at least the installation of one gear ratio and, therefore, at least one pair of gears; when these mechanisms must pass through zero gear ratio and reverse the rotation direction; it is possible to save the necessary mechanisms to generate the steps in one of the directions (e.g. reverse) as long as they coincide with a subunit of the other direction (forwards) and in exchange for a reduction in output in the first direction (reverse). The mechanism whose diagram is represented in FIG. 5 allows the reproduction in reverse of all or part of the steps of forward direction. Rectangle y represents a multistep mechanism (in the limit case it may only have one step) which allows the variation of the gear ratio from zero to a determined maximum value, shaft o can be connected to s' either by direct attachment or by a gear ratio that reverses the rotation direction, at the time when mechanism y reaches zero gear ratio, and both shaft o and s' stop, gear ratio −1 is connected and the direct connection is disconnected, from here mechanism V reverses its function.

Combining the advantages of each one of the previously described mechanisms, a speed variation mechanism can be constituted that manages to reduce the power that circulates through the variator as much as desired with a minimum number of steps.

The scheme of FIG. 6 represents a mechanism comprised of three modules: high range, low range and inverter. The high range module is obtained via a mechanism (core) such as that of FIG. 1 whose range has been extended by a mechanism such as that represented in FIG. 2. The low range module is obtained via a mechanism such as that represented in FIG. 3. The variator is single and works both in the low range and in the high range. Finally, the inverter allows reverse gear to be produced with the same gears that operate forwards without duplicating the steps of the other two modules.

The components' characteristics are determined so that the maximum gear ratio of the low range module is greater than or equal to the minimum gear ratio of the high range module; in this way there is a gear ratio zone where it is possible to simultaneously activate the connections or clutches that connect both modules and therefore it is possible to pass from low range to high range and vice versa without stopping torque transmission to the output shaft. If the parameters are further chosen so that at a point of this zone the variator gear ratio of the low range module coincides with the variator gear ratio of the high range module, then the mechanism can be constructed with a single variator for both modules.

The scheme of FIG. 6 corresponds to a preferred application for the function; in this application we are looking for a compromise between output and number of components and it does not aim to exclude all other possible combinations, specifically:

That the low range module is constructed with a mechanism such as that of FIG. 4.

That the inverter does not exist and the mechanism covers the entire range with the successive steps.

That the low range module does not exist and in its place is a clutch or a torque converter to pass the output shaft from rest to transition gear ratio and from here work with the high range module.

That the high range module core is performed by any mechanism.

That the high range module does not exist and the mechanism such as that of FIG. 3 or one such as that of FIG. 4 cover the entire range of variability.

That the extensions do not exist and the mechanism only consists of the high range module core.

That the low range mechanism only comprises one step.

As previously explained, this invention allows that, with a reasonable number of steps, the power that passes through the variator is reduced to sufficiently small values so that the variator is performed by a pair of electric machines, one of them indiscriminately acting as engine and the other as generator. This corresponds to a preferred application, and even without excluding the possibility of any other type of speed variator, it has the following advantages:

a) Any other type of variator requires the installation of hydraulic, pneumatic or electric actuators for its control, which requires mechanical attachments and valves which, in turn, are controlled by signal electronics and power. If the variator is embodied by electric machines, the signal electronics and power directly acts on these machines and all the other elements disappear.

b) In applications in vehicles with heat engines, these same electric machines can act as starting motor and generator to charge the battery, so that, it does not in fact represent adding a further two components but a better use of components that also have to be installed.

DESCRIPTION OF THE DRAWINGS

There are four classes of drawings: diagrams representing generic mechanisms, schemes representing specific mechanisms, block diagrams and an angular velocity diagram.

The following conventions have been used in the diagrams representing generic mechanisms: A line, irrespective of whether it is a straight, curved or broken line, indicates a shaft that can rotate. A rectangle from which two straight lines exit indicates any gear ratio (irrespective of whether it is embodied by a cylindrical gear train, conical gear train, epicyclic trains etc.) between the shafts represented by these lines. The rectangles may represent both fixed and variable gear ratios; when they represent fixed gear ratios they have been identified by a label beginning with R or S, when they represent variable gear ratios they have been labelled with letter V, to indicate that the mechanism may have a multiplicity of gear ratios, between the same pair of shafts only one has been represented and has been labelled with a letter followed by a subscript. Broken lines indicate the possibility of controlling the connection or disconnection of the gear ratios to the shaft wherein they finish irrespective of how this connection and disconnection is embodied (mechanical connections, clutches etc.). To obtain a more compact representation, in FIGS. 4, 5 and 9, the following unit has been represented with a broken arrow: gear ratio plus broken lines. The circles indicate differential mechanisms, i.e. mechanisms capable of imposing a restriction between three shafts of type:

$$\omega_1 = k \cdot \omega_2 + (1-k) \cdot \omega_3$$

Where $\omega 1$, $\omega 2$ and $\omega 3$ are the angular velocities of the three shafts numbered arbitrarily and k is a constant characteristic of the mechanism and of how the shafts have been numbered. They indicate a generic differential mechanism irrespective of how this is embodied (cylindrical epicyclic trains, spherical epicyclic trains, hydraulic circuits.).

In the schemes representing specific mechanisms, the symbols typically used in mechanics to represent shafts, gears and epicyclic trains have been used, for simplicity the satellite carrier shafts have been drawn intersecting the satellites although it should be understood that all satellites can rotate freely around the corresponding satellite carrier.

In the descriptions of the drawings it will be said that a component connects a shaft when one of the component shafts is joined to the shaft in question and it is said that it can connect a shaft if one of the component shafts may be joined to the shaft in question in a controlled manner.

Figure 1:
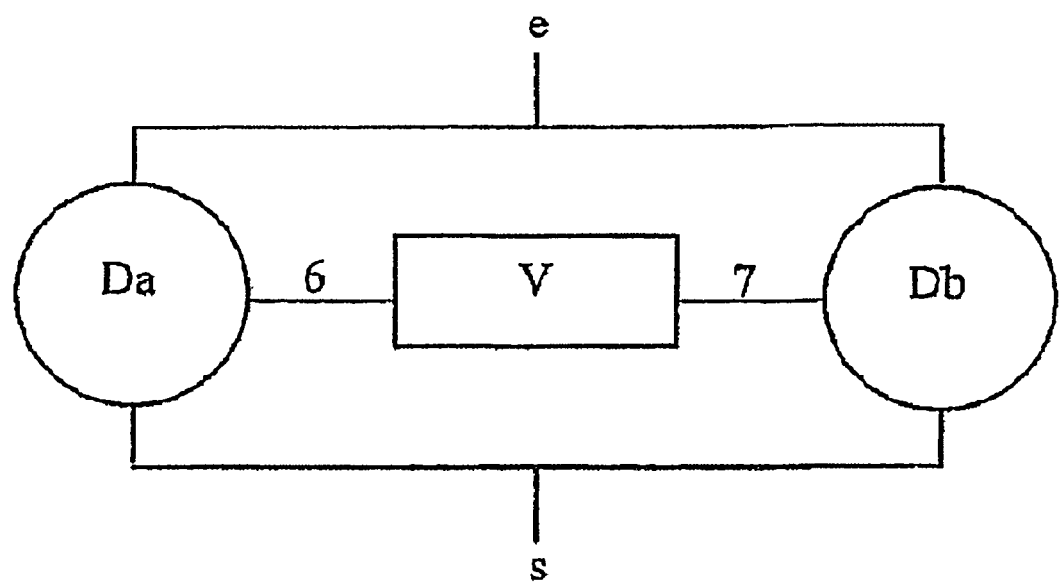
FIGS. 1, 2, 3, 4, 5, 7, 8, 9, 17, 18, 19 and 20 correspond to diagrams representing generic mechanisms.

FIG. 1: Diagram of a generic mechanism comprised of two differentials Da and Db and a variable gear ratio V. Input shaft i is joined to one of the shafts of each one of differentials Da and Db. Output shaft o is joined to another shaft of each one of differentials Da and Db. The variator or variable gear ratio V is connected between the other Da shaft (shaft 6) and the other Db shaft (shaft 7).

Figure 2:
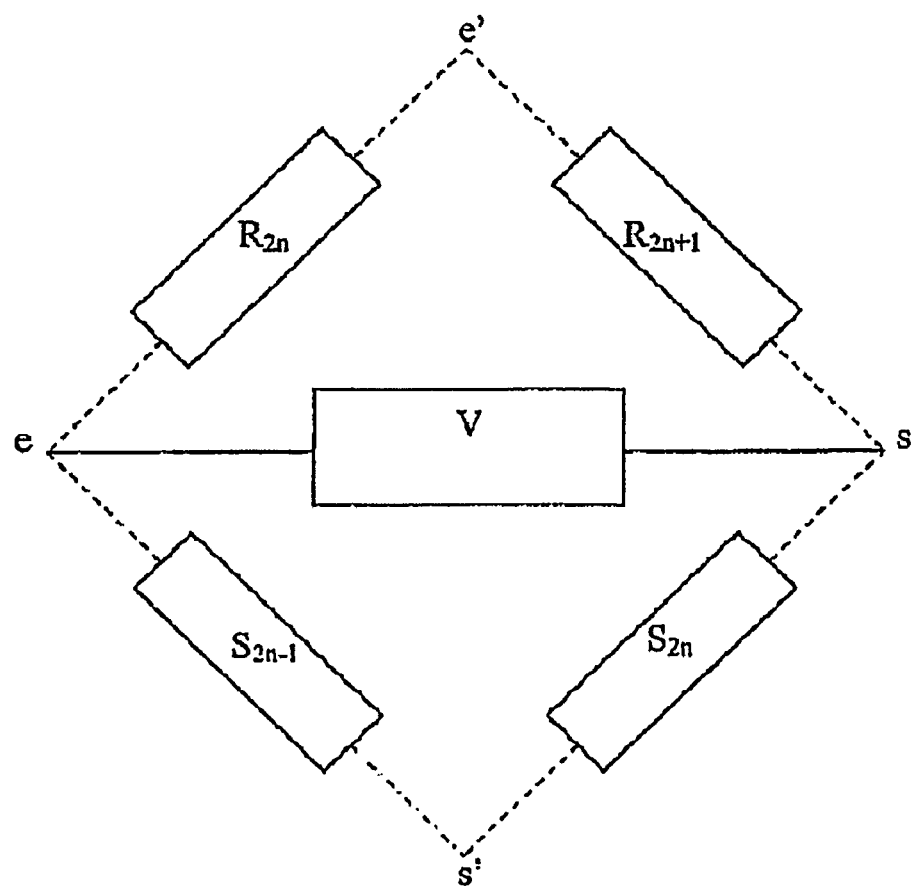

FIG. 2: Diagram of a generic mechanism comprised of a variable gear ratio V and four multiplicities of gear ratios $R_{2n}$, $R_{2n+1}$, $S_{2n}$ and $S_{2n+1}$. The variable gear ratio V connects shafts i and o, any of the gear ratios of the multiplicity of ratios $R_{2n}$ may or may not be connected in a controlled manner between shafts i and i', any of the gear ratios of the multiplicity of ratios $R_{2n+1}$ may or may not be connected in a controlled manner between shafts o and i', any of the gear ratios of the multiplicity of ratios $S_{2n}$ may or may not be connected in a controlled manner between shafts o and o', any of the gear ratios of the multiplicity of ratios $S_{2n+1}$ may or may not be connected in a controlled manner between shafts i and o'.

Figure 3:
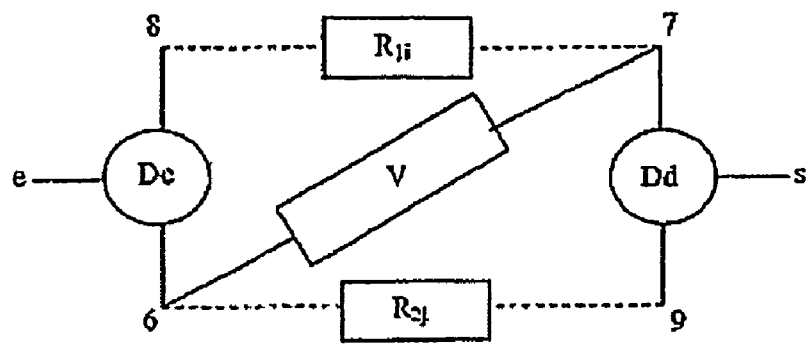

FIG. 3: Diagram of a generic mechanism comprised of a variable gear ratio V, two multiplicities of fixed gear ratios $R_{1i}$ and $R_{2j}$ and two differentials Dc and Dd. The variable gear ratio is connected between shafts 6 and 7, any of the gear ratios of the multiplicity of gear ratios $R_{1i}$ may or may not be connected in a controlled manner between shafts 8 and 7, any of the gear ratios of the multiplicity of gear ratios $R_{2j}$ may or may not be connected in a controlled manner between shafts 6 and 9. Differential Dc is connected to shafts i, 6 and 8, and differential Dd is connected to shafts 7, 9 and o.

Figure 4:
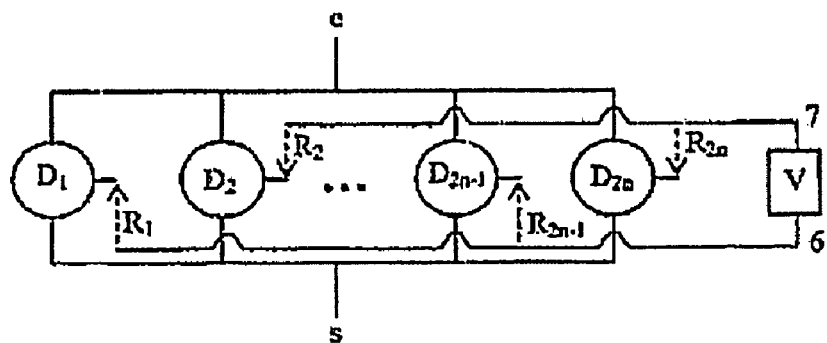

FIG. 4: Diagram of a generic mechanism comprised of a variable gear ratio V, a series of differentials $D_1, D_2, \ldots D_{2n-1}, D_{2n}$ and a series of gear ratios $R_1, R_2, \ldots R_{2n-1}, R_{2n}$. The speed variator is connected between shaft 6 and shaft 7, shaft i is joined to one of the shafts of each one of the differentials, shaft o is joined to another of the shafts of each one of the differentials, each of the gear ratios with odd subscript may connect shaft 6 with the third shaft of the differential of its same subscript and each of the even gear ratios may connect shaft 7 to the third shaft of the differential of its same subscript.

Figure 5:
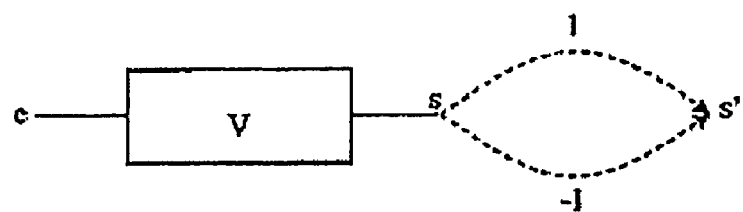

FIG. 5: Diagram of a generic mechanism comprised of a variable gear ratio V and two fixed gear ratios. The variable gear ratio is connected between shafts i and o, the fixed gear ratios may be connected between shafts o and o'. The upper arrow represents a 1 to 1 gear ratio, i.e. it may be by direct connection between shaft o and o', whilst the lower arrow represents a gear ratio that reverses the rotation direction, both have been represented in broken arrows indicating that they may or may not be connected in a controlled manner.

Figure 6:
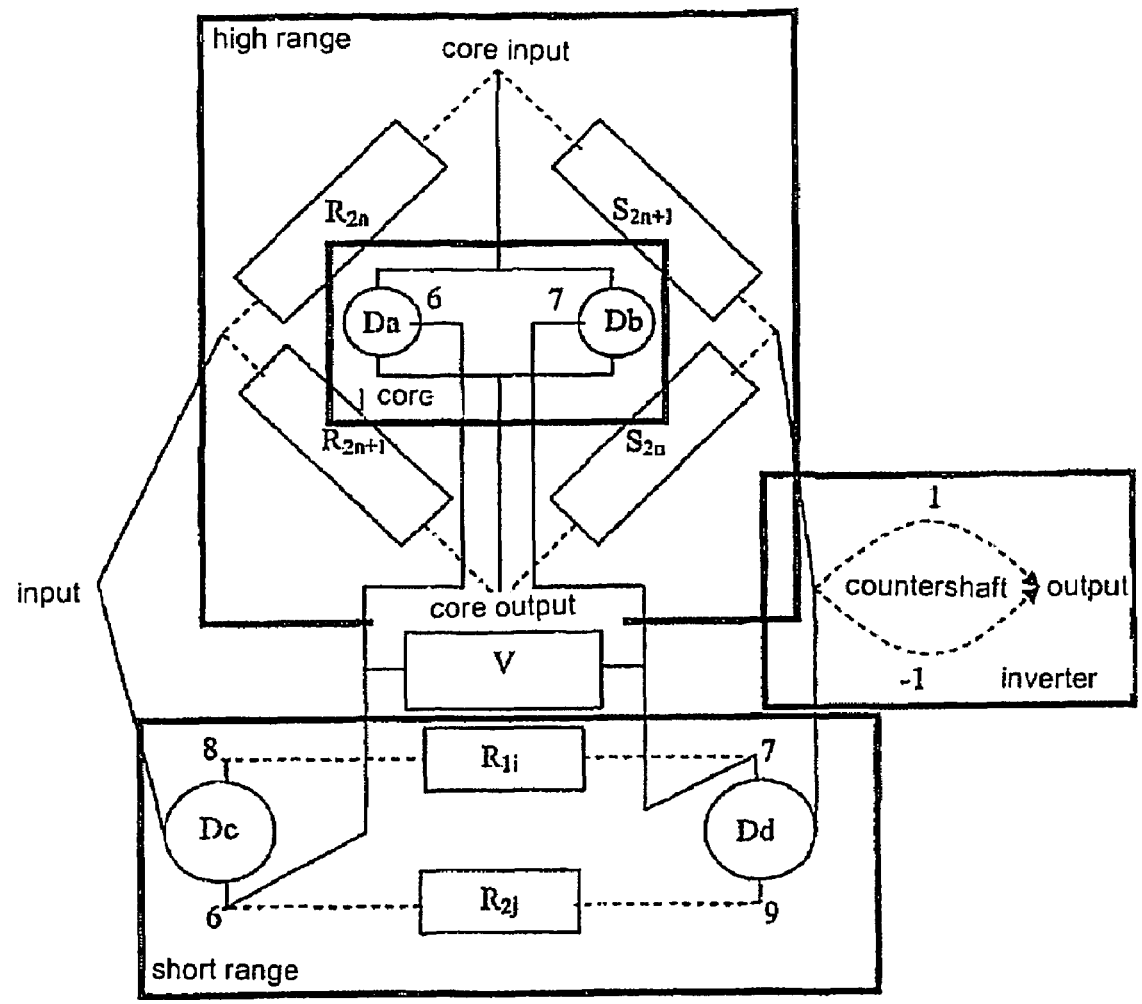

FIG. 6: Diagram of a generic mechanism that contains: a variable gear ratio V, four differentials Da, Db, Dc, Dd and six multiplicities of gear ratios $R_{2n}, R_{2n+1}, S_{2n}, S_{2n+1}, R_{1i}$ and $R_{2j}$. A shaft of each one of differentials Da and Db rotate joined to the core input shaft, another shaft of each of differentials Da and Db rotate joined to the core output shaft and the third shaft of each one of these two differentials is connected respectively to shaft 6 and to shaft 7. Variator V is connected between shafts 6 and 7. The multiplicities of gear ratios $R_{2n}$, $R_{2n+1}$, $S_{2n}$, $S_{2n+1}$ allow respectively the connection of any of their ratios between the shafts: input and core input; input and core output; core output and countershaft; core input and countershaft. Differential Dc is connected between input shafts, 6 and 8. Differential Dd is connected between shafts 7, 9 and the countershaft. The multiplicities of gear ratios $R_{1i}$ and $R_{2j}$ allow any of them to be connected between shafts 8 and 7 or 6 and 9 respectively. The broken arrows indicate that the countershafts and output shafts may be connected to one another directly or by reversing the rotation direction.

Figure 7:
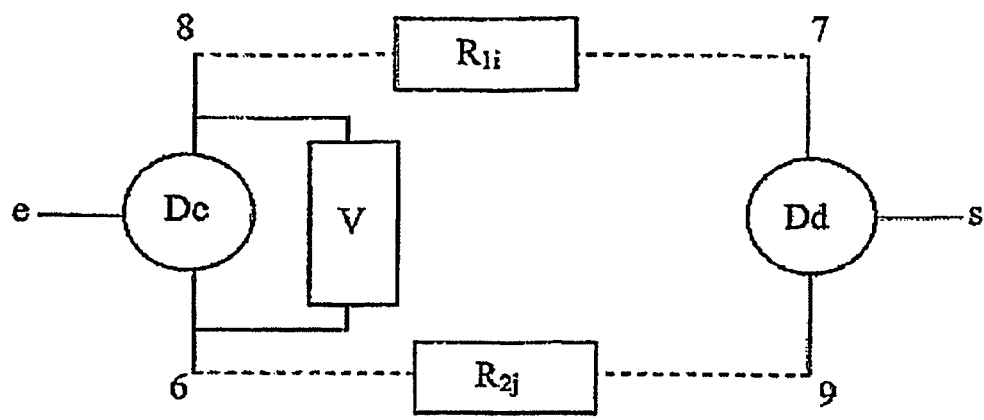

FIG. 7: Corresponds to a variant of the mechanism of FIG. 3 where the speed variator V has been connected between shafts 6 and 7, the other symbols having the same meaning that is explained when describing FIG. 3.

Figure 8:
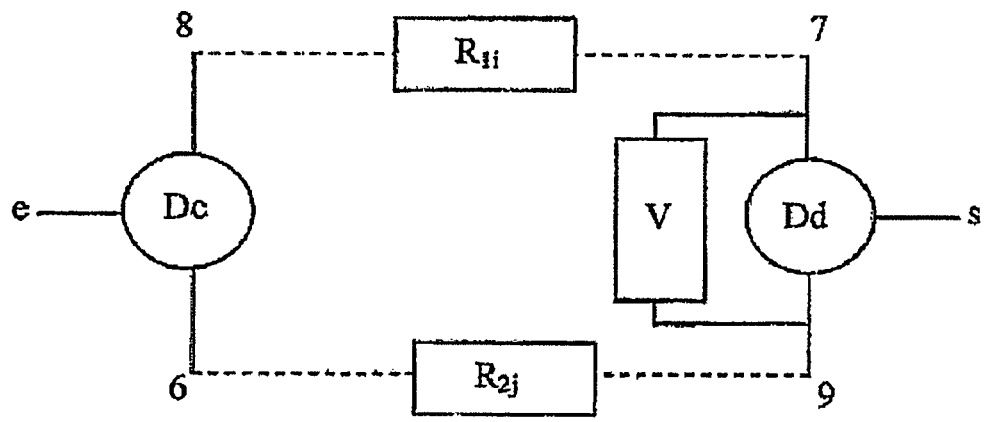

FIG. 8: Corresponds to a variant of the mechanism of FIG. 3 where the speed variator V has been connected between shafts 7 and 9, the other symbols having the same meaning that is explained when describing FIG. 3.

Figure 9:
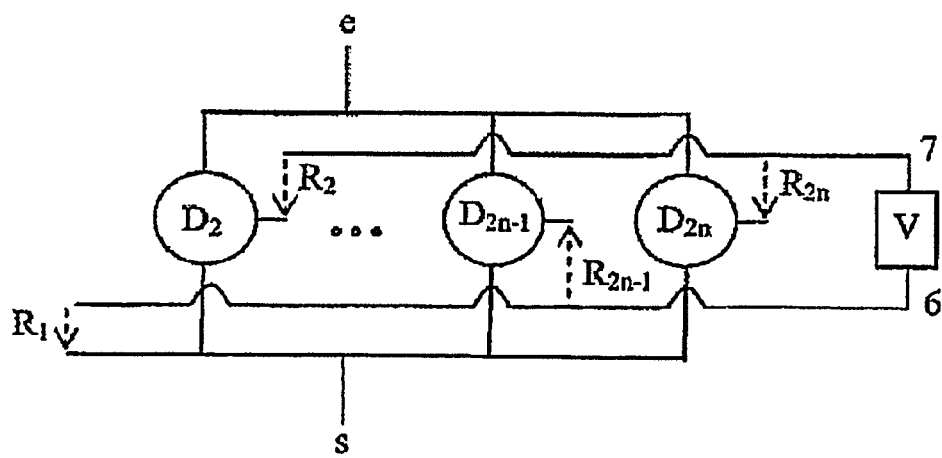

FIG. 9: Corresponds to a variant of the mechanism of FIG. 4 where differential $D_1$ does not exist and gear ratio $R_1$ allows the connection between shaft 6 and shaft o, the other symbols having the same meaning that is explained when describing FIG. 4.

Figure 10:
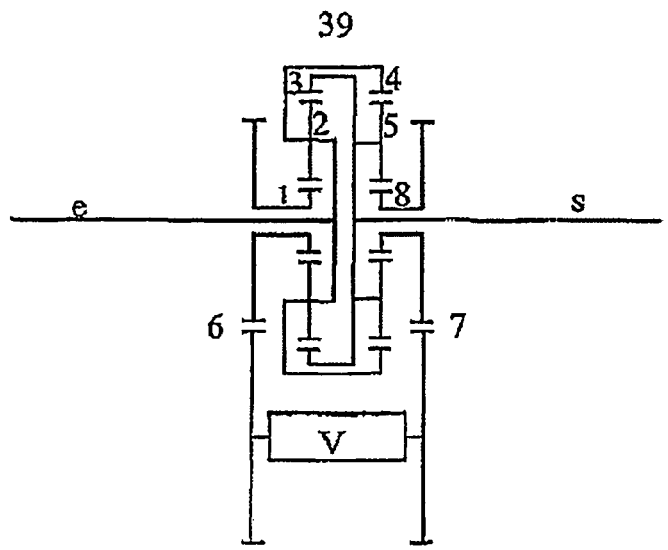
FIGS. 10, 12, 13, 14 and 15 correspond to schemes representing specific mechanisms.

FIG. 10: Scheme representing a specific mechanism that responds to an embodiment of the diagram of the generic mechanism of FIG. 1. It is comprised of two differentials and a speed variator. The first differential is formed by planet 1, the multiplicity of satellites 2 and ring 3. The second differential is comprised of planet 8, the multiplicity of satellites 5 and ring 4. Shaft i is simultaneously joined to the satellite carrier around which satellites 2 rotate and is also joined to ring 4. Shaft o is simultaneously joined to the satellite carrier around which satellites 5 rotate and is also joined to ring 3. The speed variator V is connected so that it drives shafts 6 and 7 that are joined to planets 1 and 8 with a 1 to 1 gear ratio.

Figure 11:
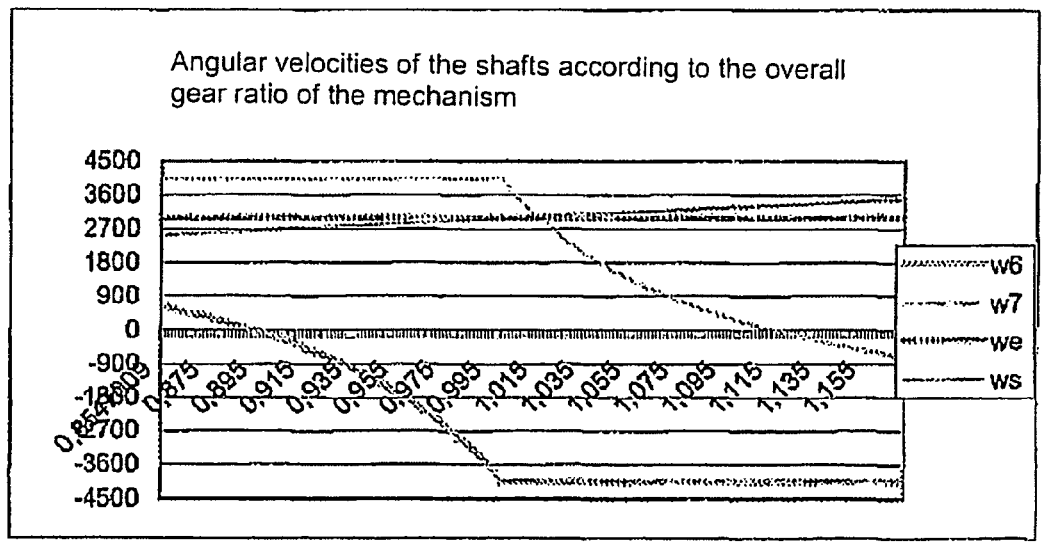
FIG. 11 is an angular velocity diagram.

FIG. 11: Diagram that represents in Cartesian coordinates, the evolution of the angular velocities of shafts i, o, 6 and 7 ($\omega_i$, $\omega_o$, $\omega_6$ and $\omega_7$) of the mechanism of FIG. 10 when shaft i is maintained at 3000 revolutions per minute and when the different gears have a certain number of teeth that is detailed in the explanation of the embodiment of the invention. The angular velocities in revolutions per minute are represented on the x-axis and the gear ratio between shaft i and shaft o on the y-axis; the rotation direction of shaft i has been taken arbitrarily as positive, the angular velocities with negative sign indicate rotation in the direction opposite to that of shaft i.

Figure 12:
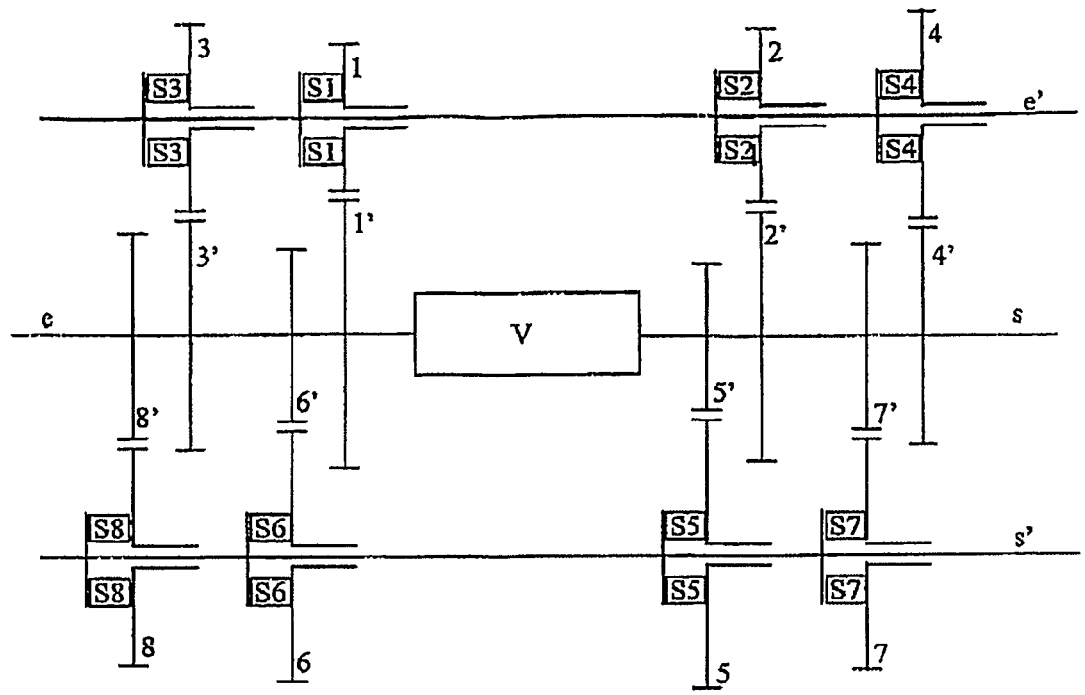

FIG. 12: Scheme representing a specific mechanism which responds to an embodiment of the diagram of the generic mechanism of FIG. 2. It consists of a speed variator V which is connected between shafts i and o and of eight pairs of gears: 1, 1'; 2, 2'; 3, 3'; 4, 4'; 5, 5'; 6, 6'; 7, 7'; 8, 8'. Gears 1, 2, 3 and 4 idle around shaft i' and may be joined to it activating one or some of the corresponding connections S1, S2, S3 and S4. Gears 5, 6, 7 and 8 idle around shaft o' and may do so joined to it activating one or some of the corresponding connections S5, S6, S7 and S8. Gears 8', 3', 6' and 1' are joined to shaft i. And gears 5', 2', 7', and 4' are joined to shaft o.

Figure 13:
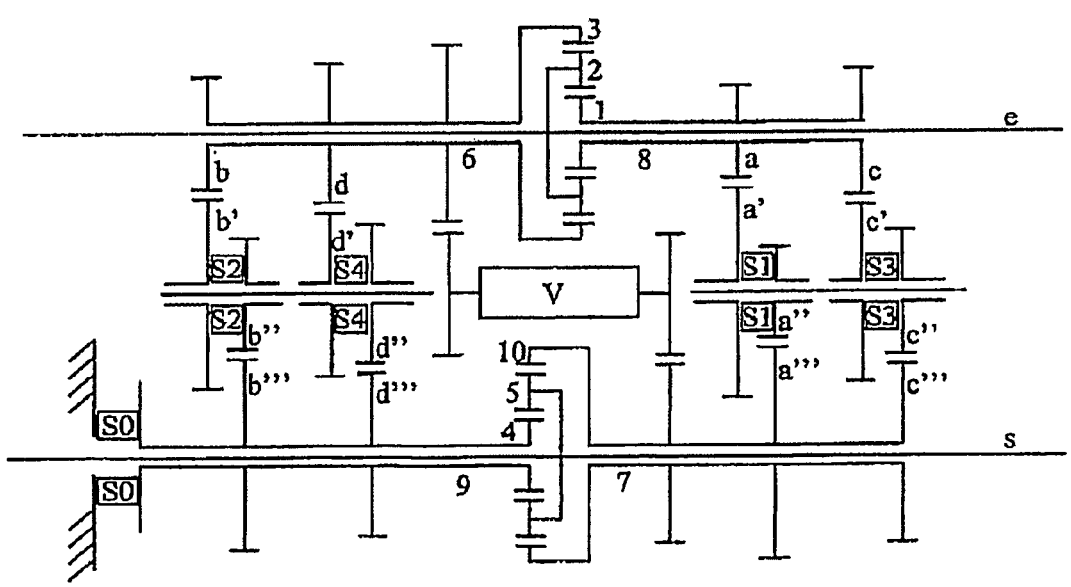

FIG. 13: Scheme representing a specific mechanism which responds to an embodiment of the diagram of the generic mechanism of FIG. 3. It contains two differentials and a speed variator V. The first differential is formed by planet 1, a plurality of satellites 2 and ring 3, the second differential is formed by planet 4, a plurality of satellites 5 and ring 10. Shaft i is joined to the satellite carrier around which the satellites 2 rotate. Shaft o is joined to the satellite carrier around which the satellites 5 rotate. Shafts 6, 8, 9 and 7 are respectively joined to ring 3, to planet 1, to planet 4 and to ring 10. The speed variator V is connected between shafts 6 and 7. Gears b and d are joined to shaft 6, gears a and c are joined to shaft 7, gears b''' and d'' are joined to shaft 9, gears a''' and c''' are joined to shaft 7. The pairs of gears a', a''; b', b''; c', c'' and d', d'' idle around countershafts but can be independent or joined to one another by the connections represented by S1, S2, S3, and S4 respectively. Shaft 9 can also be kept blocked against all rotations by the brake represented by $S_0$ which is maintained fixed to the mechanism chassis.

Figure 14:
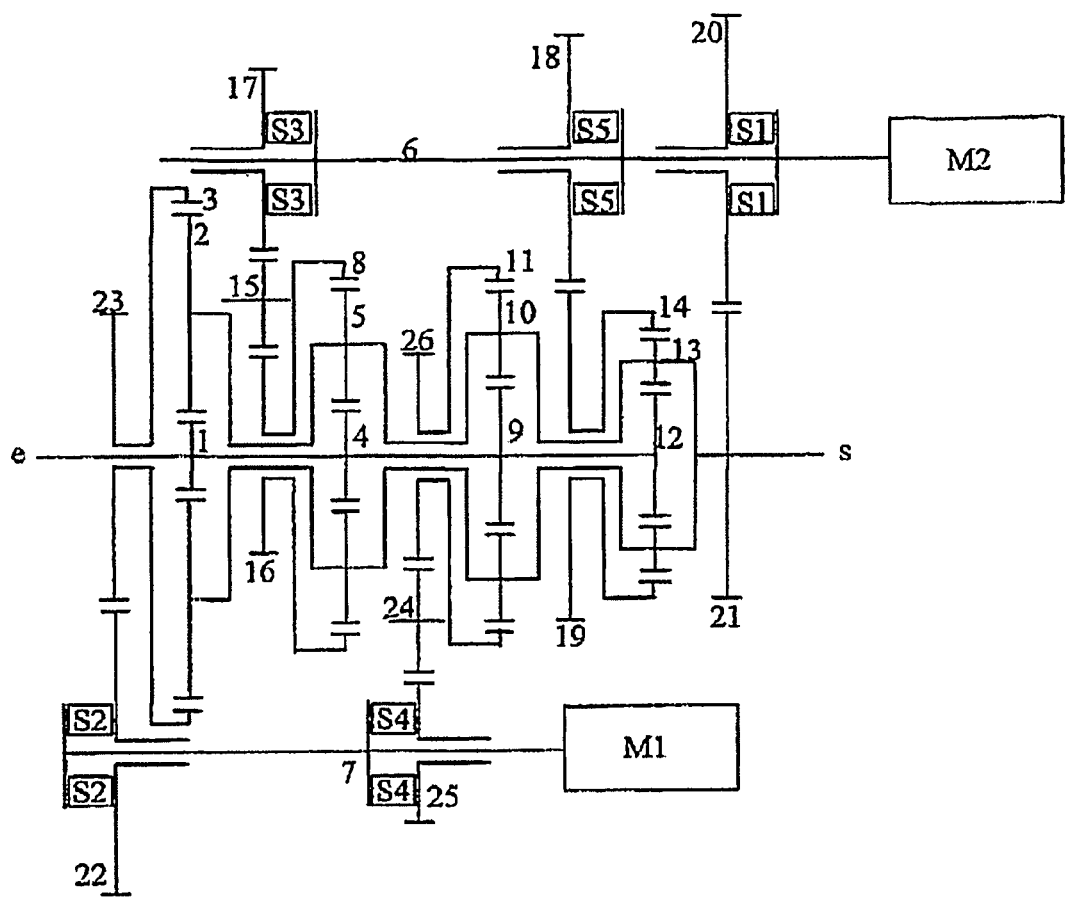

FIG. 14: Scheme representing a specific mechanism which responds to an embodiment of the diagram of the generic mechanism of FIG. 9. It contains four differentials embodied by planets 1, 4, 9 and 12, pluralities of satellites 2, 5, 10 and 13 and rings 3, 8, 11 and 14. It also contains two electric machines M1 and M2, either of which can work as engine or generator, machine M1 is joined to shaft 7 and M2 to shaft 6. Shaft i is joined to planets 1, 4, 9 and 12. Shaft o is joined to the planet carrier shafts around which planets 2, 5, 10 and 13 rotate. Gears 17, 18 and 20 idle round shaft 6 but they may become joined to it by the action of the connections represented by S3, S5, and S1. Gears 22 and 25 idle around shaft 7 but they become joined to it by the action of the connections represented by S2 and S4. Pinion 17 gears with 15 which in turn gears with 16 which is joined to ring 8. Pinion 18 gears with 19 which is joined to ring 14. Pinion 20 gears with 21 which is joined to shaft o. Pinion 22 gears with 23 which is joined to ring 3. Pinion 25 gears with 24 which in turn gears with 26 which is joined to ring 11.

Figure 15:
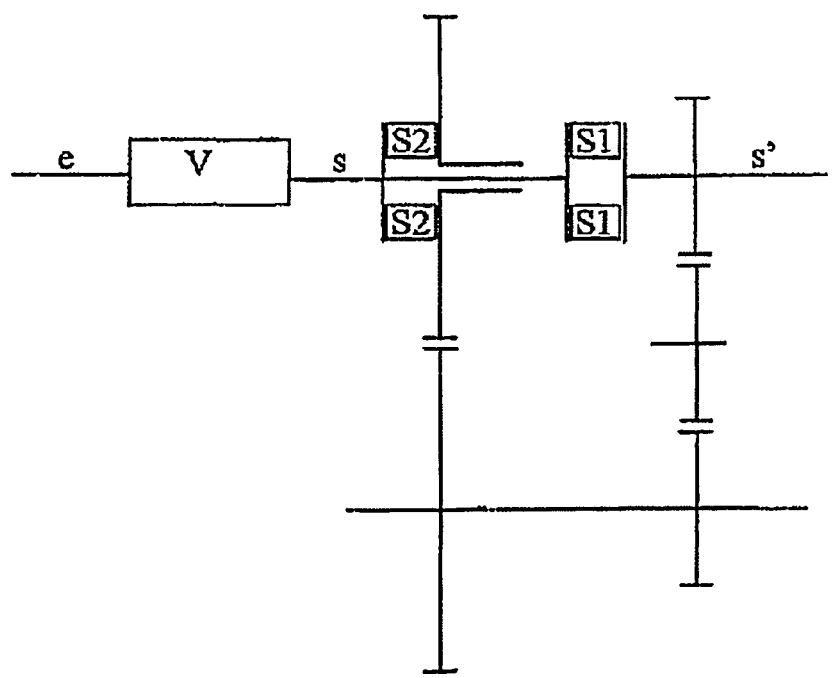

FIG. 15: Scheme representing a specific mechanism which responds to an embodiment of the diagram of the generic mechanism of FIG. 5. It contains a speed variator V connected between shafts i and o, direct connection S1 allows shafts o and o' to be directly joined, whilst connection S2 allows them to be connected with a reversal of the rotation direction.

Figure 16:
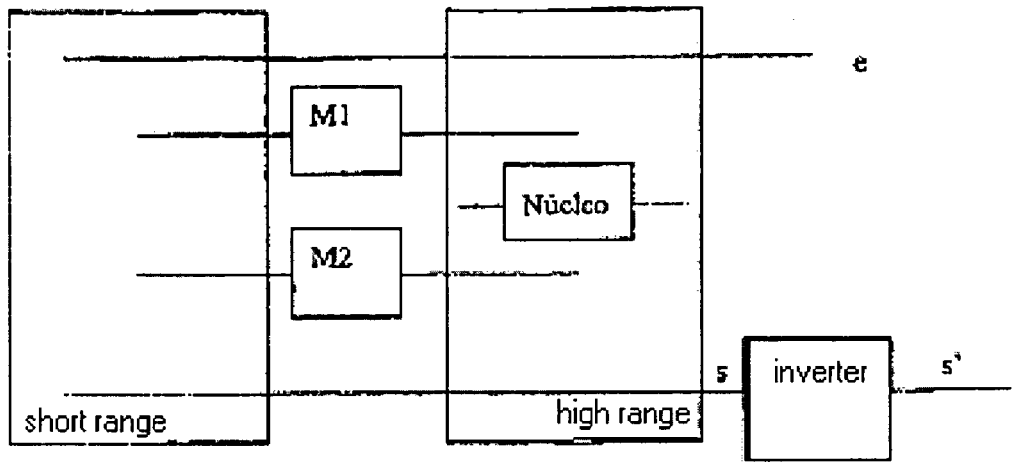
FIG. 16 is a block diagram.

FIG. 16: Block diagram representing a specific mechanism which responds to an embodiment of the generic mechanism of FIG. 6. The "Low range" block represents a mechanism such as FIG. 13. The "High range" block represents a mechanism such as FIG. 12 where the variable gear ratio may be embodied by a mechanism such as FIG. 1. Blocks M1 and M2 represent different electric machines that may indiscriminately work as an engine or generator and which allow embodying the speed variator of FIG. 1 and FIG. 13 simultaneously. The "Inverter" block represents a mechanism such as that represented in FIG. 15 between shafts o and o'.

Figure 17:
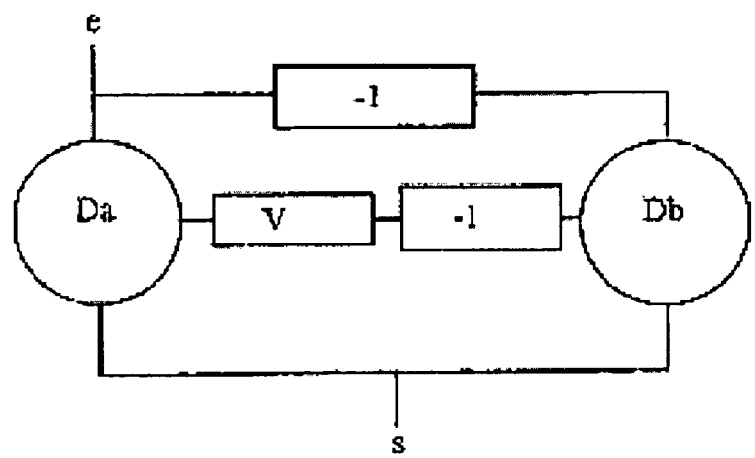

FIG. 17: Diagram of a generic mechanism to which the mechanism proposed in patent U.S. Pat. No. 2,384,776 responds. This patent proposes the use of differentials which are embodied by spherical epicyclic trains; between the input shaft and differential Db there is a reverse of the rotation direction and between the variator and differential Db there is also a reverse in rotation direction which is embodied by auxiliary gears, output shaft o is simultaneously driven a shaft of differential Da and by a shaft of differential Db.

Figure 18:
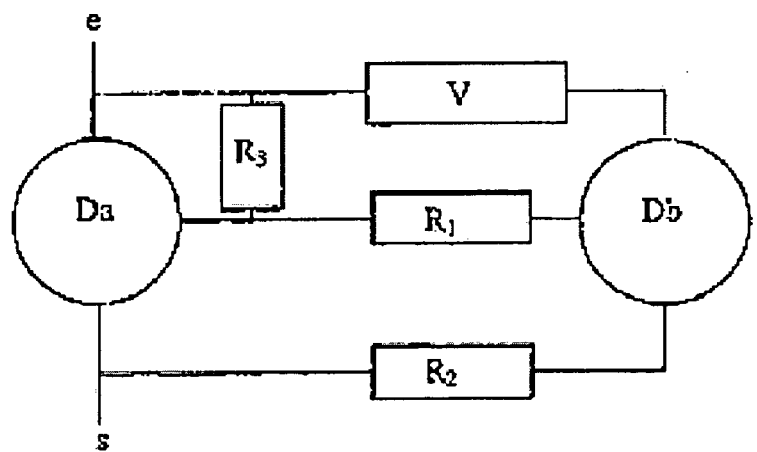

FIG. 18: Diagram of a generic mechanism to which the mechanism proposed in patent U.S. Pat. No. 4,936,165 responds. This mechanism contains two differentials Da and Db, a speed variator V and three fixed gear ratios R1, R2 and R3. Input shaft i and output shaft o are joined respectively to shafts of differential Da.

Figure 19:
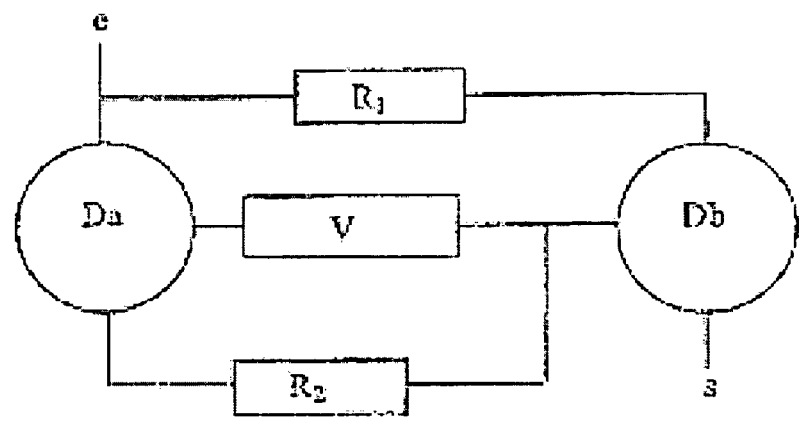

FIG. 19: Diagram of a generic mechanism to which the mechanism proposed in patent ES2190739 responds. This mechanism contains two differentials Da and Db, a speed variator V and two fixed gear ratios R1 and R2. Input shaft i and output shaft o are joined respectively to shafts of differential Da and differential Db.

Figure 20:
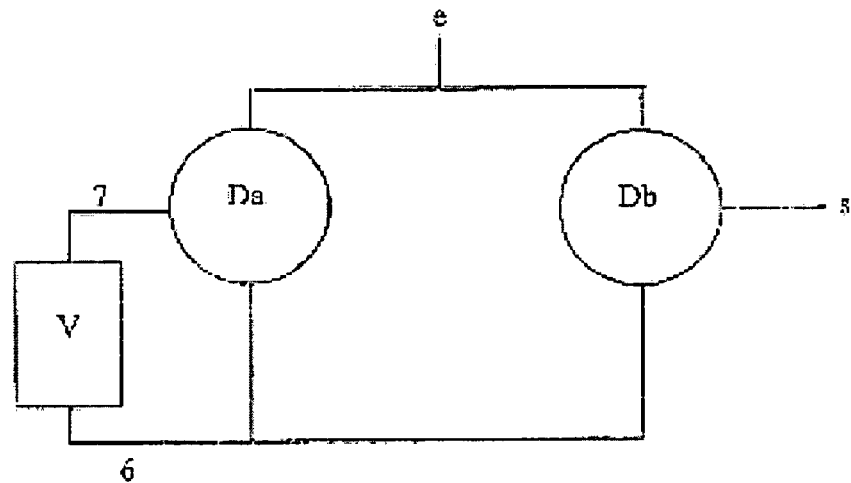

FIG. 20: Diagram of a generic mechanism to which the mechanism proposed in patent U.S. Pat. No. 6,595,884 responds. This mechanism contains two differentials Da and Db, a speed variator V. Input shaft i is joined simultaneously to a shaft of differential Da and to one of differential Db. The output shaft is joined to another shaft of differential Db. The speed variator is connected between the other two shafts of differential Da (shafts 7 and 6). Shaft 6 is also connected to the third shaft of differential Db.

Figure 21:
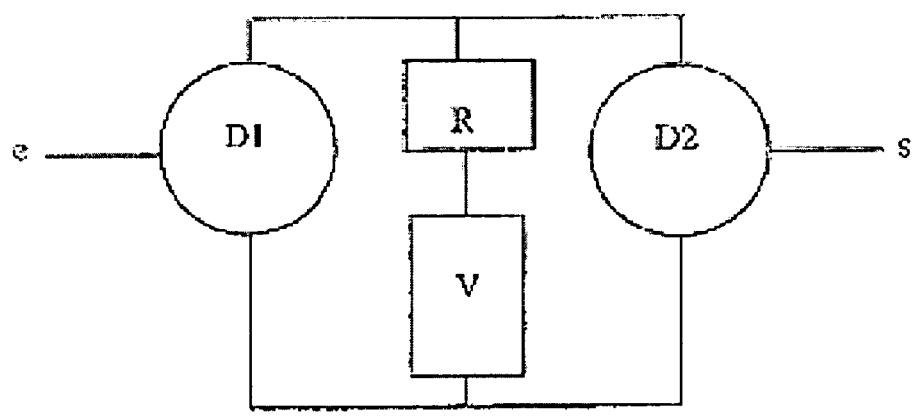

FIG. 21: Diagram of a generic mechanism to which the mechanism proposed in patent U.S. Pat. No. 5,643,121 responds when it works in the rotation direction reversal mode. Two differentials D1 and D2 operate in this mode, the input shaft being joined to a shaft of differential D1 and the output shaft being joined to a shaft of differential D2, the other two shafts of differentials D1 and D2 being connected to one another and between them, in turn, the fixed gear ratio R and the speed variator V are connected in series.

PREFERRED EMBODIMENT OF THE INVENTION

By way of example, without aiming to be limitative, below we disclose an embodiment of each one of the previously explained mechanisms.

FIG. 10 represents a mechanism that responds to the diagram of FIG. 1. Differentials Da and Db are embodied by the epicyclic trains obtained by planet 1, satellites 2 and ring 3 for the case of Da and by planet 8, satellites 5 and ring 4 in the case of differential Db. The input shaft is joined to ring 4 and also drives the shaft around which the satellites 2 rotate. The output shaft is joined to ring 3 and also drives the shaft around which the satellites 5 rotate. Variator y is connected via gear ratios 6 and 7 to planets 1 and 8. Planets 1 and 8 are constructed from 13 teeth, satellites 2 and 5 are constructed from 49 teeth and rings 3 and 4 are constructed from 111 teeth. With this configuration the gear ratio obtained is:

$$\tau_{io} = \frac{\omega_o}{\omega_i} = \frac{111 \cdot r + 124}{124 \cdot r + 111}$$

Where r is the gear ratio that the variator imposes between shafts 6 and 7. FIG. 11 shows the angular velocities that must be applied to shafts 6 and 7 to achieve that the gear ratio varies from 1/1.17 to 1.17, it also shows the angular velocity obtained in the output shaft supposing that the angular velocity of the input shaft is kept constant and equal to 3000 revolutions per minute. In this configuration the power that circulates through the variator in no case exceeds 5.5% of the power that passes through the mechanism from the input shaft to the output shaft.

FIG. 12 shows, as an example, a mechanism that responds to the diagram of FIG. 2 for the particular case of four regimes, gears or steps. Gear ratios $R_0$ and $R_2$ that connect input shaft i of the variator V to input shaft i' of the mechanism, are embodied by the pairs of gears 1, 1' and 3, 3'. Gear ratios $R_1$ and $R_3$ that connect the output shaft o of variator V to input shaft i' of the mechanism, are embodied by the pairs of gears 2, 2' and 4, 4'. Gear ratios $S_0$ and $S_2$ that connect the output shaft o of variator y to output shaft o' of the mechanism, are embodied by the pairs of gears 5, 5' and 7, 7'. Gear ratios $S_1$ and $S_3$ that connect the input shaft i of variator V with output shaft o' of the mechanism, are embodied by the pairs of gears 6, 6' and 8, 8'. Gears 1, 2, 3 and 4 idle on input shaft i' of the mechanism until one of the selectors S1, S2, S3, and S4 is actuated, which allows each one them to be joined respectively to input shaft i' so the respective gear ratios may be connected or disconnected. Gears 5, 6, 7 and 8 idle on the output shaft of mechanism s' until one of the selectors S5, S6, S7, and S8 is actuated, which allows each one of them to be joined respectively to output shaft o' so the respective gear ratios may be connected or disconnected. The teeth of each gear are selected in this example in the following way: gear 1, 55 teeth; gear 2, 60 teeth; gear 3, 66 teeth; gear 4, 72 teeth; gear 5, 95 teeth; gear 6, 90 teeth; gear 7, 84 teeth; gear 8, 78 teeth; gear 1', 95 teeth; gear 2', 90 teeth; gear 3', 84 teeth; gear 4', 78 teeth; gear 5', 55 teeth; gear 6', 60 teeth; gear 7', 66 teeth; gear 8', 72 teeth. The form of connecting and disconnecting selectors S1 to S8 to obtain each of the four steps and the gear ratios obtained in each of them is detailed in the following table:

| Step | Selectors connected | Gear ratios of variator V | | The mechanism's gear ratios | |
|---|---|---|---|---|---|
| | | Initial | Final | Minimum | Maximum |
| 1 | S1, S5 | 0.848 | 1.152 | 0.284 | 0.386 |
| Transition 1-2 | S1, S5, S2, S6 | 1.152 | | 0.386 | |
| 2 | S2, S6 | 1.152 | 0.848 | 0.386 | 0.524 |
| Transition 2-3 | S2, S6, S3, S7 | 0.848 | | 0.524 | |
| 3 | S3, S7 | 0.848 | 1.175 | 0.524 | 0.725 |
| Transition 3-4 | S3, S7, S4, S8 | 1.175 | | 0.725 | |
| 4 | S4, S8 | 1.175 | 0.848 | 0.725 | 1.005 |

In this table, the initial gear ratio of the variator is that which corresponds to the minimum gear ratio of the mechanism and the final gear ratio corresponds to the maximum. As can be seen, variator V works by passing alternatively from its maximum gear ratio to its minimum and vice versa, so that there is no discontinuity in its operation; in the transitions the four gear ratios may remain simultaneously connected as they produce exactly the same gear ratio between the shafts. The result is that a mechanism is achieved that can vary continuously without interruptions in the torque transmission from a gear ratio of 0.284 to 1.005 using a variator whose variability only needs to go from 0.848 to 1.175; if this variator is embodied with a mechanism such as that represented in FIG. 10, previously described, the power that has to pass through the variator is 5.5% of the total power the mechanism transmits.

FIG. 13 shows a mechanism that responds to the scheme of FIG. 3, for the particular case of four steps. Differential Dc has been embodied by the epicyclic train comprised of planet 1, satellites 2 and ring 3. Differential Dd has been embodied by the epicyclic train comprised of planet 4, satellites 5 and ring 10. The speed variator V has been connected by different gear ratios on one side to shaft 6 which is joined to ring 3 and on the other side to shaft 7 which is joined to ring 10. Input shaft i is joined to the satellite carrier shaft of differential Dc (planets 2). Output shaft o is joined to the satellite carrier shaft of differential Dd (planets 5). Gear ratio R is O for which reason it has been embodied by the possibility of blocking the rotation of shaft 9 which is joined to planet 4; this blocking is achieved by the activation of selector SO. Between shaft 6 (joined to ring 3) and shaft 9 (joined to planet 4) two possible gear ratios R and R have been provided embodied by gear trains b, b', b", b" and d, d',d",d" respectively; selectors S2 and S4 allow the connection or disconnection of wheel b' with b" and of d' with d" respectively; if wheel b' is connected to b" both rotate joined together and the gear train formed by b, b', b", b" imposes the gear ratio determined by its corresponding number of teeth between shaft 6 and shaft 9; if wheel b' and b" are disconnected, both idle driven respectively by b and by b" without imposing any gear ratio between shafts 6 and 9, similarly in the event of connection or not of wheel d' with d". Between shaft 8 (joined to planet 1) and shaft 7 (joined to ring 10) two possible gear ratios R and R have been provided embodied by gear trains a, a', a", a" and c, c',c",c" respectively, selectors S1 and S3 allow the connection or disconnection of wheel a' with a" and of c' with c" respectively; if wheel a' is connected to a" both rotate joined to one another and the gear train formed by a, a', a", a" imposes the gear ratio determined by its corresponding number of teeth between shaft 8 and shaft 7; if wheel a' and a" are disconnected, both idle driven respectively by a and a" without imposing any gear ratio between shafts 8 and 7, similarly, in the case of connection or not of wheel c' with c". The numbers of teeth selected for each one of the gears in this example are the following: planet 1 and planet 4, 16 teeth; satellites 2 and satellites 5, 8 teeth; ring 3 and ring 10, 32 teeth, gears b and b", 14 teeth; gears b' and b", 36 teeth; gears d and d", 18 teeth; gears d' and d", 32 teeth; gears a and a", 11 teeth; gears a' and a", 39 teeth; gears c and c", 16 teeth; gears c' and c", 34 teeth. The speed variator is embodied by any type of mechanism that allows progressively varying the rates of the two shafts to which it is connected to gear ratios from O (shaft 7 stopped whilst 6 rotates freely) to the infinite (shaft 6 stopped whilst 7 freely rotates); this can be achieved by pairs of electric machines (one working as generator and the other as engine), by pairs of hydraulic machines (one working as a pump and the other as engine), by a mechanism produced from the combination of variators and differentials etc. The form of connecting and disconnecting selectors S1 to S8 to obtain each of the four steps and gear ratios obtained in each one of them are detailed in the following table:

| Step | Connected selectors | Angular velocity of shaft 6 | | Angular velocity of shaft 7 | | The mechanism's gear ratios | |
|---|---|---|---|---|---|---|---|
| | | Initial | Final | Initial | Final | Initial | Final |
| 1 | S0, S1 | 4500 | 0 | 0 | 358 | 0 | 0.080 |
| Transmission 1-2 | S0, S1, S2 | | 0 | 358 | | 0.080 | |
| 2 | S1, S2 | 0 | 4500 | 358 | 0 | 0.080 | 0.151 |
| Transmission 2-3 | S1, S2, S3 | 4500 | | 0 | | 0.151 | |
| 3 | S2, S3 | 4500 | 0 | 0 | 996.54 | 0.151 | 0.221 |
| Transmission 3-4 | S2, S3, S4 | | 0 | 996.54 | | 0.221 | |
| 4 | S3, S4 | 0 | 4500 | 996.54 | 0 | 0.221 | 0.316 |

In this table the angular velocities of shafts 6 and 7 are expressed in revolutions per minute and correspond to the case that the input shaft rotates constantly at an angular velocity of 3000 revolutions per minute. As can be seen, during the transitions two gear ratios can be maintained simultaneously either between shafts 6 and 9 or between shafts 8 and 7 because the transition occurs at a time when these shafts are not rotating.

FIG. 14 shows a mechanism that responds to the scheme of FIG. 4, or more exactly its alternative of FIG. 9, for the particular case 10 of 4 steps. Differential D2 has been embodied by the epicyclic train comprised of planet 1, satellites 2 and ring 3. Differential D3 has been embodied by the epicyclic train comprised of planet 4, satellites 5 and ring 8. Differential D4 has been embodied by the epicyclic train comprised of planet 9, satellites 10 and ring 11. Differential D5 has been embodied by the epicyclic train comprised of planet 12, satellites 13 and ring 14. Differential D1 has the characteristic O and is therefore embodied by the possibility of directly connecting output shaft o to shaft 6 via the connection activated by selector S1 (this is the case more specifically represented in FIG. 9). The speed variator between shafts 6 and 7 has been embodied in this case by two electric machines M1 and M2; they must be reversible machines so that when one acts as generator the other acts as engine and they must be connected so that the energy the engine consumes is at all times that produced by the generator, and they must have a control system that allows imposing the gear ratio between both. The input shaft is simultaneously joined to planets 1, 4, 9 and 12 of differentials D2, D3, D4 and D5. The output shaft is joined to the satellite carrier shafts of satellites 2, 5, 10 and 13. Shaft 6 can be connected either to ring 8 (via gears 17, 15 and 16) or to ring 14 (via gears 18 and 19) by means of the connections that are activated by selectors S3 and S5 respectively, it can also be connected to the output shaft by means of the gear ratio obtained by gears 20 and 21 which is activated by selector S1. Shaft 7 can either be connected to ring 3 (via gears 22 and 23) or to ring 11 (via gears 25, 24 and 26) by means of the connections which are activated by selectors S2 and S4 respectively. The number of teeth of each gear wheel are chosen in the following form: planet 1, 9 teeth; satellites 2, 54 teeth; ring 3, 117 teeth; planet 4, 12 teeth; satellites 5, 30 teeth; ring 8, 72 teeth; planet 9, 18 teeth; satellites 10, 24 teeth; ring 11, 66 teeth; planet 12, 16 teeth; satellites 13, 12 teeth; ring 14, 40 teeth; gear 17, 28 teeth; gear 15, 40 teeth; gear 16, 24 teeth; gear 18, 77 teeth; gear 19, 55 teeth; gear 20, 66 teeth; gear 21, 66 teeth; gear 22, 66 teeth; gear 23, 66 teeth; gear 25, 26 teeth; gear 24, 42 teeth; gear 26, 22 teeth. The form of connecting and disconnecting selectors S1 to S4 to obtain each of the four steps and the gear ratios obtained in each of them are detailed in the following table:

| Step | Connected selectors | Angular velocity of shaft 6 | | Angular velocity of shaft 7 | | The mechanism's gear ratios | |
|---|---|---|---|---|---|---|---|
| | | Initial | Final | Initial | Final | Initial | Final |
| 1 | S1, S2 | 0 | −221 | −238 | 0 | 0 | 1/14 |
| Transmission 1-2 | S1, S2, S3 | −221 | | 0 | | 1/14 | |
| 2 | S2, S3 | −221 | 0 | 0 | 238 | 1/14 | 2/14 |
| Transmission 2-3 | S2, S3, S4 | 0 | | 238 | | 2/14 | |
| 3 | S3, S4 | 0 | −221 | 238 | 0 | 2/14 | 3/14 |
| Transmission 3-4 | S3, S4, S5 | −221 | | 0 | | 3/141 | |
| 4 | S4, S5 | −221 | 0 | 0 | −238 | 3/14 | 4/14 |

In this table the angular velocities of shafts 6 and 7 are expressed in revolutions per minute and correspond to the case that the input shaft rotates constantly at an angular velocity of 3094 revolutions per minute. As can be seen, during the transitions three gear ratios can be maintained simultaneously connected because the gear ratios and the characteristics of the differentials have been chosen so that the gear ratio obtained before and after the transition are exactly the same. Since, as has been previously explained, there is freedom to choose the first two gear ratios, these can be chosen so that the maximum angular velocities of shafts 6 and 7 are the most appropriate ones for the work of the machines that embody the speed variator.

FIG. 15 shows an example that responds to the mechanism of FIG. 5. Blocks V represents a mechanism that allows continuously varying the gear ratio between shaft i and shaft o from O to a determined maximum value. Shaft o may be directly connected to output shaft o' by means of actuating connection S1, or it can be indirectly connected via the countershaft and the sets gears represented in the Figure and that reverse the rotation direction, this second connection being achieved by connecting S2. At the point when the gear ratio of mechanism V is 0, shaft o remains stopped, for which reason Si and S2 may be simultaneously connected; disconnecting one of the two it is chosen if from this point on the gear ratio variations generated by the mechanism and a rotation that will be produced in shaft o' will be in the same direction of shaft o or in the opposite direction.

FIG. 16 represents a block diagram of a mechanism that responds to the scheme represented in FIG. 6. The "High range" block is embodied reproducing therein the mechanism represented in FIG. 12 where shafts i and o of FIG. 16 correspond to i' and o' of FIG. 12 and where block V has been embodied reproducing therein a mechanism such as that of FIG. 1. The "short range" block is embodied by reproducing therein the mechanism represented in FIG. 13. The speed variator is embodied by two electric machines M1 and M2 (both reversible and which may work alternatively, one as an engine and the other as generator or vice versa) and their shafts are connected by different pairs of gears with gear ratio 1:1 to shafts 6 and 7 both of the mechanism of FIG. 1 and the mechanism of FIG. 12. The "Inverter" block is embodied by reproducing therein the mechanism represented in FIG. 15.

It functions as follows. When the output shaft is stopped, the connection Si or S2 of the inverter is connected in accordance with whether one wants to go backwards or forwards (it is possible to maintain both connected simultaneously if we do not want to lose the torque transmission to the output shaft).

The invention claimed is:

1. Continuously variable mechanical transmission mechanism that allows extending the range of variation that contains:

A) a core that comprises:
a core input shaft (I) and a core output shaft (0);
a first differential (Da) and a second differential (Db),
a variator (V) connected to a first shaft (6) of the first differential (Da) and to a first shaft (7) of the second differential (Db), so that the variator (V) allows to regulate the proportion of the power that passes through each one of said differentials, from the core input shaft (I) to the core output shaft (o),
having each one of said first differential (Da) and second differential (Db) a second shaft connected to the core input shaft (I) and a third shaft connected to the core output shaft (o); and B) an input shaft (I') of the mechanism configured to be alternatively connected to the core input shaft (I) and to the core output shaft (o), and an output shaft (o') of the mechanism configured to be alternatively connected to the core output shaft (o) and to the core input shaft (I), so that when the input shaft (I') of the mechanism is connected to the core input shaft (I), the output shaft (o') of the mechanism is connected to the core output shaft (o), and when the input shaft (I') of the mechanism is connected to the core output shaft (o), the output shaft (o') of the mechanism is connected to the core input shaft (I), C) comprising the mechanism in addition four gear ratios units ($R_{2n}$, $R_{2n+}$, $S_{2n}$, $S_{2n+1}$), each one comprising a multiplicity of gear ratios, being configured so that:
the connection between the input shaft (I') of the mechanism and the core input shaft (I) is done via a first ($R_{2n}$) of said gear ratio units and according to a gear ratio selected from said first ($R_{2n}$) unit,
the connection between the input shaft (I') of the mechanism and the core output shaft (o) is done via a second ($R_{2n+1}$) of said gear ratio units and according to a gear ratio selected from said second ($R_{2n+1}$) unit,
the connection between the output shaft (o') of the mechanism and the core input shaft (I) is done via a third ($S_{2n+1}$) of said gear ratio units and according to a gear ratio selected from said third ($S_{2n+1}$) unit,
the connection between the output shaft (o') of the mechanism and the core output shaft (o) is done via a fourth ($S_{2n}$) of said gear ratio units and according to a gear ratio selected from said fourth ($S_{2n}$) unit.

2. Mechanism as claimed in claim 1, wherein the characteristics of its differentials and of its gear ratios have been selected so that it produces a continuously variable gear ratio from zero to a maximum value.

3. Mechanism as claimed in claim 1, wherein the characteristics of its differentials and of its gear ratios have been selected so that it produces a continuously variable gear ratio from a minimum negative value to a maximum positive value passing through zero and reversing the rotation direction.

4. Mechanism as claimed in claim 1, wherein the output shaft (0) of the mechanism is connectable to a shaft in a selective way by a direct connection or by a set of gears which reverse the rotation direction.

5. Mechanism as claimed in claim 1, wherein the variator (V) consists of two electric machines that can work indiscriminately as a generator or as an engine and controlled by electronic circuits.

6. Mechanism as claimed in claim 5, in a machine with heat engine, wherein the electric machines which comprise the variator are a starting motor of the machine and an electric generator to charge a battery of the machine.

7. Mechanism as claimed in claim 1, wherein one of the gear ratios is zero, and it is embodied by the possibility of braking or blocking one of the shafts that it connects, doing so joined to a chassis of the mechanism.

8. Continuously variable mechanical transmission mechanism, that contains
an input shaft (I) and an output shaft (o);
a first differential (Dc) and a second differentials (Dd),
a variator (V) configured so that it allows gear ratios to be obtained between 0 and ∞ between an input shaft and an output shaft of the variator (V), so that it allows gear ratios to be obtained among a gear ratio in which the output shaft remains blocked while the input shaft rotates freely and a gear ratio in which the input shaft is blocked while the output shaft rotates freely, being the variator (V) connected to a first shaft (6) of the first differential (Dc) and to a first shaft (7) of the second differential (Dd);
two sets ($R_{1i}$, $R_{2j}$) of gear ratios units each one comprising a plurality of gear ratios and with a clutch or connection system configured so that it is possible to connect in a selective mode a gear ratio within each set ($R_{1i}$, $R_{2j}$), so that it remains connected,
being the input shaft (I) joined to a second shaft of the first differential (Dc), and being the output shaft (o) joined to a second shaft of the second differential (Dd),
being one of the sets ($R_{1i}$) disposed so that any of its gear ratios may be connected between a third shaft (8) of the first differential (Dc) and the first shaft (7) of the second differential (Dd), and being the other of the sets ($R_{2j}$) disposed so that any of its gear ratios may be connected between a third shaft (9) of the second differential (Dd) and the first shaft (6) of the first differential (Dc).

9. Mechanism as claimed in claim 8, wherein the output shaft (0) of the mechanism is connectable to a shaft in a selective way by a direct connection or by a set of gears which reverse the rotation direction.

10. Continuously variable mechanical transmission mechanism, that contains
an input shaft (I) and an output shaft (o);
a first differential (Dc) and a second differential (Dd),
a variator (V) configured so that it allows gear ratios to be obtained between 0 and ∞ between an input shaft and an output shaft of the variator (V), so that it allows gear ratios to be obtained among a gear ratio in which the output shaft remains blocked while the input shaft rotates freely and a gear ratio in which the input shaft is blocked while the output shaft rotates freely, being the variator (V) connected to a first shaft (6) of the first differential (Dc) and to a third shaft (8) of the first differential (Dc);

characterized in that also comprises two sets ($R_{1i}$, $R_{2j}$) of gear ratios units each one comprising a plurality of gear ratios and with a clutch or connection system configured so that it is possible to connect in a selective mode a gear ratio within each set ($R_{1i}$, $R_{2j}$), so that it remains connected, being the input shaft (I) joined to a second shaft of the first differential (Dc), and being the output shaft (o) joined to a second shaft of the second differential (Dd), being one of the sets ($R_{1i}$) disposed so that any of its gear ratios may be connected between a third shaft (8) of the first differential (Dc) and the first shaft (7) of the second differential (Dd), and being the other of the sets ($R_{2n}$) disposed so that any of its gear ratios may be connected between a third shaft (9) of the second differential (Dd) and the first shaft (6) of the first differential (Dc).

11. Continuously variable mechanical transmission mechanism, that contains an input shaft (I) and an output shaft (o);

a first differential (Dc) and a second differential (Dd), a variator (V) configured so that it allows gear ratios to be obtained between 0 and ∞ between an input shaft and an output shaft of the variator (V), so that it allows gear ratios to be obtained among a gear ratio in which the output shaft remains blocked while the input shaft rotates freely and a gear ratio in which the input shaft is blocked while the output shaft rotates freely, being the variator (V) connected to a first shaft (7) of the second differential (Dd) and to a third shaft (9) of the second differential (Dd);

characterized in that also comprises two sets ($R_{1i}$, $R_{2j}$) of gear ratios units each one comprising a plurality of gear ratios and with a clutch or connection system configured so that it is possible to connect in a selective mode a gear ratio within each set ($R_{1i}$, $R_{2j}$), so that it remains connected, being the input shaft (I) joined to a second shaft of the first differential (Dc), and being the output shaft (o) joined to a second shaft of the second differential (Dd), being one of the sets ($R_{1i}$) disposed so that any of its gear ratios may be connected between a third shaft (8) of the first differential (Dc) and the first shaft (7) of the second differential (Dd), and being the other of the sets ($R_{2j}$) disposed so that any of its gear ratios may be connected between a third shaft (9) of the second differential (Dd) and the first shaft (6) of the first differential (Dc).

12. Continuously variable mechanical transmission mechanism, that contains:

an input shaft (I) and an output shaft (o);

a plurality of differentials ($D_1$, $D_2$, $D_{2n-1}$, $D_{2n}$), that comprises a plurality of even differentials ($D_2$, $D_{2n}$) and a plurality of odd differentials ($D_1$, $D_{2n-1}$);

a variator (V) configured so that it allows gear ratios to be obtained between 0 and ∞ between an input shaft and an output shaft of the variator (V), so that it allows gear ratios to be obtained among a gear ratio in which the output shaft remains blocked whilst the input shaft rotates freely and a gear ratio in which the input shaft remains blocked while the output shaft rotates freely, being the variator (V) connected to a first shaft (6) and to a second shaft (7), being the input shaft (I) joined to a first shaft of all the differentials ($D_1$, $D_2$, $D_{2n-1}$, $D_{2n}$), and being the output shaft (o) joined to a second shaft of all the differentials $D_1$, $D_2$, $D_{2n-1}$, $D_{2n}$, a plurality of sets ($R_1$, $R_2$, $R_{2n-1}$, $R_{2n}$) of gear ratios, that comprises a plurality of even sets ($R_2$, $R_{2n}$) and a plurality of odd sets ($R_1$, $R_{2n-1}$), comprising each one a plurality of gear ratios and with means of connections or clutches configured so that it is possible to connect in a selective mode a gear ratio within each set ($R_1$, $R_2$, $R_{2n-1}$, $R_{2n}$), so that it remains connected, being the sets ($R_1$, $R_2$, $R_{2n-1}$, $R_{2n}$) disposed so that the gear ratios of each one of the odd sets ($R_1$, $R_{2n-1}$) may be connected between a third shaft of each one of the odd differentials (01, 02n−1) and the first shaft (6) connected to the variator (V), and being the sets ($R_1$, $R_2$, $R_{2n-1}$, $R_{2n}$) disposed so that the gear ratios of each one of the even sets ($R_2$, $R_{2n}$) may be connected between a third shaft of each one of the even differentials ($D_2$, $D_{2n}$) and the second shaft (7) connected to the variator (V).

13. Continuously variable mechanical transmission mechanism, as claimed in claim 12, wherein one of the first and second shafts (6) or (7) of the variator (V) is directly connectable to the output shaft (o) via a gear ratio ($R_1$) which can be activated or deactivated by means of a clutch or any other type of suitable connection.

14. Continuously variable mechanical transmission mechanism, that comprises:

a mechanism for low range, that comprises a mechanism as described in claim 8, for gear ratios where it is necessary to limit the output torque so that the maximum permitted is not exceeded, and in addition comprises:

a mechanism for high range, for gear ratios where the output torque is always lower than the maximum permitted torque without need for any limitation, that comprises a mechanism that allows extending the range of variation that contains A) a core that comprises:

a core input shaft (I) and a core output shaft (o);

a first differential (Da) and a second differential (Db), a variator (V) connected to a first shaft (6) of the first differential (Da) and to a first shaft (7) of the second differential (Db), so that the variator (V) allows to regulate the proportion of the power that passes through each one of said differentials, from the core input shaft (I) to the core output shaft (o), having each one of said first differential (Da) and second differential (Db) a second shaft connected to the core input shaft (I) and a third shaft connected to the core output shaft (o); and B) an input shaft (I') of the mechanism configured to be alternatively connected to the core input shaft (I) and to the core output shaft (o), and an output shaft (o') of the mechanism configured to be alternatively connected to the core output shaft (o) and to the core input shaft (I), so that when the input shaft (I') of the mechanism is connected to the core input shaft (I), the output shaft (o') of the mechanism is connected to the core output shaft (o), and when the input shaft (I') of the mechanism is connected to the core output shaft (o), the output shaft (o') of the mechanism is connected to the core input shaft (I), C) comprising the mechanism in addition four gear ratios units ($R_{2n}$, $R_{2n+1}$, $S_{2n}$, $S_{2n+1}$), each one comprising a multiplicity of gear ratios, being configured the mechanism so that:

the connection between the input shaft (I') of the mechanism and the core input shaft (I) is done via a first ($R_{2n}$) of said gear ratio units and according to a gear ratio selected from said first ($R_{2n}$) unit, the connection between the input shaft (I') of the mechanism and the core output shaft (o) is done via a second ($R_{2n+1}$) of said gear ratio units and according to a gear ratio selected from said second ($R_{2n+1}$) unit, the connection between the output shaft (o') of the mechanism and the core input shaft (I) is done via a third ($S_{2n+1}$) of said gear ratio units and according to a gear ratio selected from said third ($S_{2n+1}$) unit, the connection between the output shaft (o') of the mechanism and the core output shaft (o) is done via a fourth ($S_{2n}$) of said gear ratio units and according to a gear ratio selected from said fourth ($S_{2n}$) unit.

15. Continuously variable mechanical transmission mechanism as claimed in claim 14, wherein the minimum gear ratio of the high range mechanism is equal to the maximum gear ratio of the low range mechanism.

16. Continuously variable mechanical transmission mechanism as claimed in claim 14, wherein in the region of minimum gear ratios of the high range mechanism and the region of maximum gear ratios of the low range mechanism there is overlapping with gear ratios common to both.

17. Continuously variable mechanical transmission mechanism as claimed in claim 14, wherein the transition between the low range and high range is performed by suitable clutch or connection at the time when the gear ratio of both coincide.

18. Continuously variable mechanical transmission mechanism as claimed in claim 14, that contains an only speed variator (V) for both the high range mechanism and the low range mechanism.

19. Continuously variable mechanical transmission mechanism, that contains
a core that comprises
a core input shaft (I) and a core output shaft (o);
a first differential (Da) and a second differential (Db),
a variator (V) connected to a first shaft (6) of the first differential (Da) and to a first shaft (7) of the second differential (Db), so that the variator (V) allows to regulate the proportion of the power that passes through each one of said differentials, from the core input shaft (I) to the core output shaft (o),
having each one of said first differential (Da) and second differential (Db) a second shaft connected to the core input shaft (I) and a third shaft connected to the core output shaft (o)
wherein said first differential (Da) is formed by a planet (1), a multiplicity of satellites (2) and a ring (3), and said second differential (Db) is formed by a planet (8), a multiplicity of satellites (5) and a ring (4), being the input shaft (I) simultaneously joined to the satellite carrier around which satellites (2) rotate and also joined to the ring (4), whilst the output shaft (o) is simultaneously joined to the satellite carrier around which satellites (5) rotate and is also joined to the ring (3), being the variator (V) connected so that it drives shafts (6) and (7), that are joined to the planets (1) and (8).

* * * * *